Feb. 8, 1966 W. KEISTER 3,234,335

TELEPHONE SWITCHING NETWORK

Filed June 28, 1962 6 Sheets-Sheet 1

INVENTOR
W. KEISTER
BY
William H. Kamstra
ATTORNEY

Feb. 8, 1966 W. KEISTER 3,234,335

TELEPHONE SWITCHING NETWORK

Filed June 28, 1962 6 Sheets-Sheet 2

Feb. 8, 1966 W. KEISTER 3,234,335

TELEPHONE SWITCHING NETWORK

Filed June 28, 1962 6 Sheets-Sheet 3

United States Patent Office 3,234,335

Patented Feb. 8, 1966

3,234,335

TELEPHONE SWITCHING NETWORK

William Keister, Short Hills, N.J., assignor to Bell Telephone Laboratories, Incorporated, New York, N.Y., a corporation of New York Filed June 28, 1962, Ser. No. 205,931
13 Claims. (Cl. 179—18)

This invention relates to telephone switching networks, and particularly to the control of such networks capable of responding at electronic speeds.

Telephone switching networks of the character related to the present invention comprise a number of switches arranged in stages to provide interconnections between any one of a plurality of input transmission terminals and any one of a plurality of output transmission terminals. A simple telephone system may be achieved by such a network when subscriber substations are connected to both input and output transmission terminals. The switching network is then employed to establish a transmission path between a calling and a called subscriber The basic switches which ultimately are operated to establish each of the connections in the various stages to complete a desired transmission path each comprise an *n* by *m* coordinate array of crosspoints. Assuming *n* transmission inputs and *m* transmission outputs connected to each switch, any one of the *n* inputs may be connected to any one of the *m* outputs simply by closing an electrical contact at the crosspoint of the switch defined by the *m* and *n* coordinates.

Electrical contacting means which may be employed in a crosspoint switch to establish transmission path connections take various forms and a number of these are well known in the telephone switching art. Although electronic means such as gas tubes, for example, for completing transmission path connections are also well known in the art, this invention concerns itself particularly with those connecting means in which metallic contacts are actually closed to establish a transmission path. Electromechanical relays having contacts associated therewith have in the past proven highly useful in establishing network connections. However, the time required for these electromechanical relays to respond to energizing current pulses which time is excessive in the context of high speed electronic switching systems has created the need for an electrical contacting means which is operable responsive to electrical pulses occurring at electronic speeds. A highly advantageous answer to this need, fulfilling the requirement of high operating speeds while retaining the advantages inherent in a mechanical switch, is the contacting device known as a ferreed. This device is described in Patent 2,995,637 of A. Feiner et al., issued August 8, 1961, and comprises a pair of magnetically responsive electrical reed contacts associated with a magnetic structure having remanent magnetic properties. The ferreed is organized such that when a flux is induced in the magnetic structure in one direction by a current pulse applied to an operate winding, the flux is closed through the electrical reed contacts causing their closure. The remanent properties of the structure maintain the contacts closed after the current pulse which induced the flux is interrupted. The contacts are opened by a reverse current pulse applied to another winding, which reverse current pulse causes a reverse flux which closes through another portion of the magnetic structure rather than through the reed contacts.

The ferreed is thus wholly compatible with electronic telephone systems in which high speed energizing current pulses are applied to control the establishment of a crosspoint transmission connection. Although a disparity exists between the response time of the reed contacts and the time duration of the energizing current pulses, the magnetic structure, which may advantageously be fabricated of a ferrite material, provides an ideal buffer between these two occurrences. A control flux is readily induced or switched in the structure responsive to high speed pulses and remains, or "latches," to actuate the relatively slower operating contacts.

The organization of the control windings of a ferreed may advantageously be such that when both of two control windings are energized the reed contacts are closed and remain closed, the contacts being opened when either one but not both of the windings are energized. Such a winding arrangement is described in Patent 3,037,085 of T. N. Lowry, issued May 29, 1962, and makes possible the differential excitation of ferreeds as briefly described in the immediately foregoing. In this T. N. Lowry patent is also described a coordinate *n* by *m* array switch made of differentially excited ferreeds. In this switch one of the windings of each of the ferreeds representing the crosspoints is connected in an *n* coordinate control conductor and the other winding of each of the ferreeds is connected in an *m* coordinate control conductor. To close the contacts of a ferreed at a selected crosspoint the *m* and *n* coordinate control conductors whose coordinate intersection defines the selected crosspoint are simultaneously energized. The contacts of the selected crosspoint ferreed close in response to the energization of its two control windings in its response time after the brief energizing current pulses are removed from the defining *m* and *n* coordinate control conductors. When the contacts of the selected crosspoint ferreed are closed, a transmission connection through the switch is completed between coordinate transmission conductors which may be discretely associated with the energizing control conductors *m* and *n* defining the selected crosspoint.

When the differentially excited ferreeds are arranged in coordinate fashion it is clear that each of the other ferreeds having a winding included in the energized *m* and *n* coordinate control conductors will have only one of their control windings energized. In accordance with the differential excitation mode of operation, each of the operated ferreeds of a coordinate switch having a winding included in the energized *m* and *n* coordinate control conductors will be restored to its normal released state, causing its contacts to open and leaving only the selected crosspoint ferreed operated. This operation of a ferreed array switch has been termed "destructive mark" operation. In the "destructive mark" switch as described in the aforementioned patent of T. N. Lowry, the selected *m* and *n* coordinate control conductors are separately although simultaneously energized from separate energizing pulse sources.

Although in the patent of T. N. Lowry referred to, a simple switching network is described for purposes of illustration, in practice such a network would normally comprise many more stages, each stage containing a large number of coordinate array ferreed switches. A transmission connection between a calling and a called subscriber would thus involve many separate transmission connections established by selected crosspoint ferreeds in the switches and stages. In prior art switching networks the problem of the most economic manner of accomplishing the selection of internal transmission paths through the network is continually encountered. Thus, when the network is very large the selection of individual transmission paths through each stage frequently involves complicated and costly access circuitry. When each stage is separately actuated the problem is also faced with respect to the provision of precisely timed energizing currents for the simultaneous and reliable operation of the many electrical contacts completing each extension of the transmission path to be established.

Accordingly, it is an object of this invention to provide a new and novel telephone switching network which achieves a substantial reduction in access circuitry.

It is another object of this invention to improve the reliability of operation of telephone switching networks.

Still another object of this invention is to simplify the access circuitry for controlling the establishment of selected transmission paths through a telephone switching network and thereby achieve an overall cost reduction.

A further object of this invention is the selection of transmission paths through a telephone switching network by external means operative only at the input and output ends of the network.

It is also an object of this invention to provide new and novel telephone switching networks and control circuit combinations.

The foregoing and other objects of this invention are achieved in one illustrative embodiment thereof which makes advantageous use of a novel ferreed switch arrangement described in the copending application of W. S. Hayward, Jr., Serial No. 206,055, filed June 28, 1962, now Patent 3,110,772 issued November 12, 1963. In the coordinate *n* by *m* ferreed switch array there described the output end of each of the *m* coordinate control conductors and the input end of each of the *n* coordinate control conductors are connected to a common conducting bus. A crosspoint of this switch is selected by applying an energizing current pulse to the input end of the *m* control conductor partially defining the selected crosspoint while at the same time a path to ground is connected to the output end of the *n* control conductor completing the definition of the selected crosspoint. When a selected crosspoint of this switch is energized, as described above, a transmission connection is completed through closed contacts of the selected ferreed crosspoint between *m* and *n* transmission conductors which may be discretely associated with the *m* and *n* coordinate control conductors which define the selected crosspoint. Obviously the same current pulse is thus applied to both control windings of the differentially excited ferreed making up the selected crosspoint of the switch. Both an absolute time and pulse magnitude coincidence is thus insured. This ferreed array, which comprises the basic switching element of the present invention will be termed hereinafter simply as a switch.

A next step in the organization of the switching network according to this invention arranges individual ferreed switches in a grid array. Each grid includes a primary and secondary stage symmetrical arrangement of ferreed switches. The output coordinate control conductors of each switch of the primary stage are connected by means of conducting control links to the respective input coordinate control conductors of each of the switches of the secondary stage corresponding to the numerical position of the former switches in the primary stage. Transmission links paralleling the conducting controllinks may be advantageously provided to connect the coordinate transmission conductors associated with the coordinate control conductors of the primary and secondary stage switches. The first switch of the primary stage thus has its output coordinate control conductors successively connected to the corresponding first input coordinate control conductors of each switch of the secondary stage. This interstage control connection is completed with the successive connection of the output coordinate control conductors of the primary stage last switch to the corresponding last input coordinate control conductors of each of the switches of the secondary stage. Assuming *n* input and *n* output transmission terminals for each switch and *n* switches per stage, it will be apparent that any input transmission terminal to a grid may be connected to $n^2$ output transmission terminals via the interstage transmission links.

In the symmetrical interstage connections described generally in the foregoing, one and only one conducting control path exists between any input control terminal of the grid and any one output control terminal. It is one feature of this invention that, once an input control terminal and an output control terminal are specified, the one conducting control path existing therebetween is continuous and permanently determined. This feature is made possible by the use of the common conducting bus of the ferreed switch to which each coordinate control conductor is connected. Energization of this one control path causes the paralleling transmission path to be completed through closed contacts of the ferreed crosspoint devices defined by the control path.

The network of this invention is further developed by a vertical and horizontal multiplication of grid arrays to make up a supergrid. This supergrid will be the largest network unit which will be described in detail hereinafter for purpose of providing an understanding of the organization and operation of specific embodiments of this invention. A plurality of the two stage grids as above described are arranged vertically on one side of the supergrid and an identical plurality of the two stage grids are arranged vertically on the other side of the supergrid. The switches of the four stages of the two pluralities of grids making up the supergrid are interconnected by three sets of interstage control and transmission links which may be designated for convenience, A, B, and C links. For purposes of description, only the control links are considered herein; it being understood that paralleling transmisison conductor links may be provided in association with each control link. The primary and secondary switches of the primary grid on one side of the supergrid may then be designated "A link" and the primary and secondary switches of the secondary grid on the other side of the supergrid may be designated "C link."

Although the supergrid network arrangement as briefly considered in the foregoing may be employed to achieve a fully operative telephone system, the supergrid network is advantageously adapted for use in a larger telephone system providing greater economy and flexibility. For example, two supergrid networks may be combined by connecting the output control and transmission terminals of the "C link" secondary switches of one supergrid to the input control and transmission terminals of the "A link" primary switches of the other supergrid. In accordance with current practice in ferreed switching networks, the supergrid interconnecting links are termed junctors. In such a symmetrical two supergrid network the junctors connect the output terminals of one supergrid and the input terminals of the supergrid in a one-to-one correspondence and the system would be additionally controlled by making possible a selection of interconnecting junctors. As mentioned in the foregoing, however, the organization of the switching networks of the present invention will assume for purposes of simplicity of description that the telephone switching network comprises only a single supergrid.

The interconnections between the second and third stages of a supergrid, that is, the connections of the "B links," are made from the output coordinate terminals of the primary grid to the input coordinate terminals of the secondary grid and are made in the same manner as the interconnections between switches of a grid. The interconnections of the "C links" in the secondary grid are made in the same manner. Both of these methods of interconnection have been briefly considered in the foregoing in connection with the primary grid of a supergrid. In this manner any one of the "B link" terminals of a "C link" primary switch may be connected to any one of the output terminals, or junctors, when two supergrids are employed in the switching network, connected to the "C link" secondary switches. In a supergrid made of an equal extension of switches vertically and horizontally, such as was the case of the composition of a grid, it is again apparent that one and only one series control path and paralleling transmission path exists between any input coordinate control terminal of a primary "A link" switch and any one output coordinate control terminal, or juncture coordinate control terminal, of a secondary "C link" switch.

Advantageously, this fact of exclusive series control paths between specified input and output coordinate control conductor terminals of the supergrid makes possible the novel transmission path selecting circuit of this invention. As was mentioned above in connection with the reference to a single ferreed switch array, by applying a current pulse to a selected input coordinate control terminal of a switch and ground potential to a selected output coordinate control terminal, the crosspoint ferreed defined by the coordinate intersection of the coordinate control conductors associated with the control terminals may be operated and its contacts closed. In the same manner in connection with the supergrid, if an energizing current pulse is applied to a selected input coordinate control terminal of a primary "A link" switch and ground potential is applied to a selected output coordinate control terminal, or junctor control terminal, of a secondary "C link" switch, the single current pulse is connected over the exclusive series control path existing between these two control terminals to actuate each of the crosspoint ferreeds having both windings thereof included in this control path. In each of the intermediate switches in the control path, the common conducting bus provides the connection between the switch coordinate control conductors. Advantageously, a single current pulse meeting whatever may be the strict requirements of time and magnitude coincidence operates each of the crosspoint ferreeds necessary to establish the network transmission connections by selectively interconnecting transmission conductors which parallel the control path.

According to another feature of this invention, the selection or marking of the control terminals at each end of the supergrid network is accomplished by means of a pair of selector trees. Advantageously, the selector trees for accomplishing the end marking of the network may comprise pnpn triodes enabled under the control of a binary register receiving its information from the common control of the telephone system in which this invention may be adapted for use. Once the end control terminals of the network are selected, only the correct control path through the network can be set up. To insure that sneak control paths between switches of the network grids do not defeat the establishing of the correct control path, each of the A, B, and C control links includes a unilateral conducting element.

It is also another feature of this invention that the end marking referred to in the foregoing may be combined with internal selection to establish a control path through the network. To accomplish the alternate internal marking, each of the common conducting busses of the ferreed switches is modified in either of two ways. In the switch arrangement contemplated in the foregoing, the common conducting bus, as described in the copending application of Hayward now patent 3,110,772 referred to, provides a continuous series control path between any $n$ coordinate control conductor and any $m$ coordinate control conductor. In one of the alternate selecting arrangements internal selection is combined with end marking by introducing a series gate in the common conducting bus between the sets of coordinate control conductors. The common conducting bus is thus made selectively controllable to complete conducting control paths between the coordinate control conductors of a ferreed switch. Another arrangement for adding internal selection to the network of this invention, instead of providing for controllable continuity in the common conducting bus of a ferreed switch, the continuous common conducting bus is connected through a shunt gate to ground or other potential. In this arrangement end marking is accomplished by applying energizing current pulses to each end of the network at selected control terminals, the two current pulses finding control paths to ground through enabled shunt gates of the common conducting busses of selected ferreed switches.

Although only a supergrid including four stages of ferreed switches is assumed herein for purposes of description, it is readily appreciated that the principles of this invention may advantageously be applied to networks expanded to virtually any number of stages. If, in any case, only one path is available through the network between any selected input and output control terminal, the various selecting arrangements of this invention may be employed to define this control path and establish its paralleling transmission connection.

It will also be appreciated that other and different electrical contacting means may be employed in the switches than the ferreed devices described in the foregoing. Obviously, however, such other electrical contacting means would be controllable by means of the differential winding arrangement or other windings which are separately and coincidentally energizable to effect operation of the contacts to interconnect transmission conductors paralleling the control paths through the network.

The foregoing and other objects and features of this invention will be better understood from a consideration of detailed descriptions of specific illustrative embodiments thereof when taken in conjunction with the accompanying drawing in which.

Figure 1:
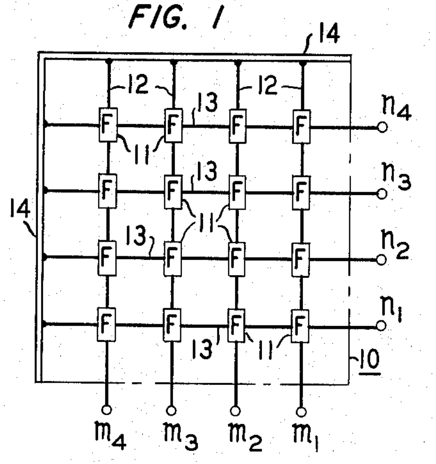
FIG. 1 depicts a coordinate ferreed crosspoint switch employed as the basic switch in one embodiment of this invention.
Figure 2:
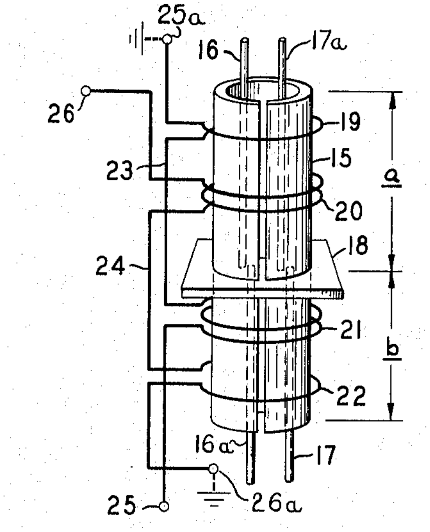
FIG. 2 depicts a ferreed device which may advantageously comprise the basic ferreed switching element at the crosspoints of the ferreed switch shown in FIG. 1 and of other ferreed switches employed in specific embodiments of this invention.
Figure 10:
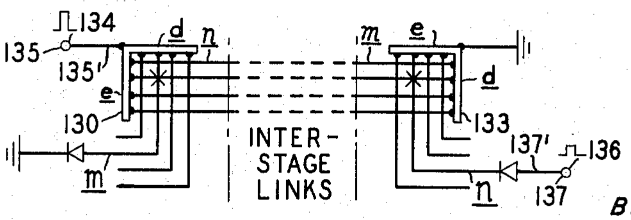
Figure 6:
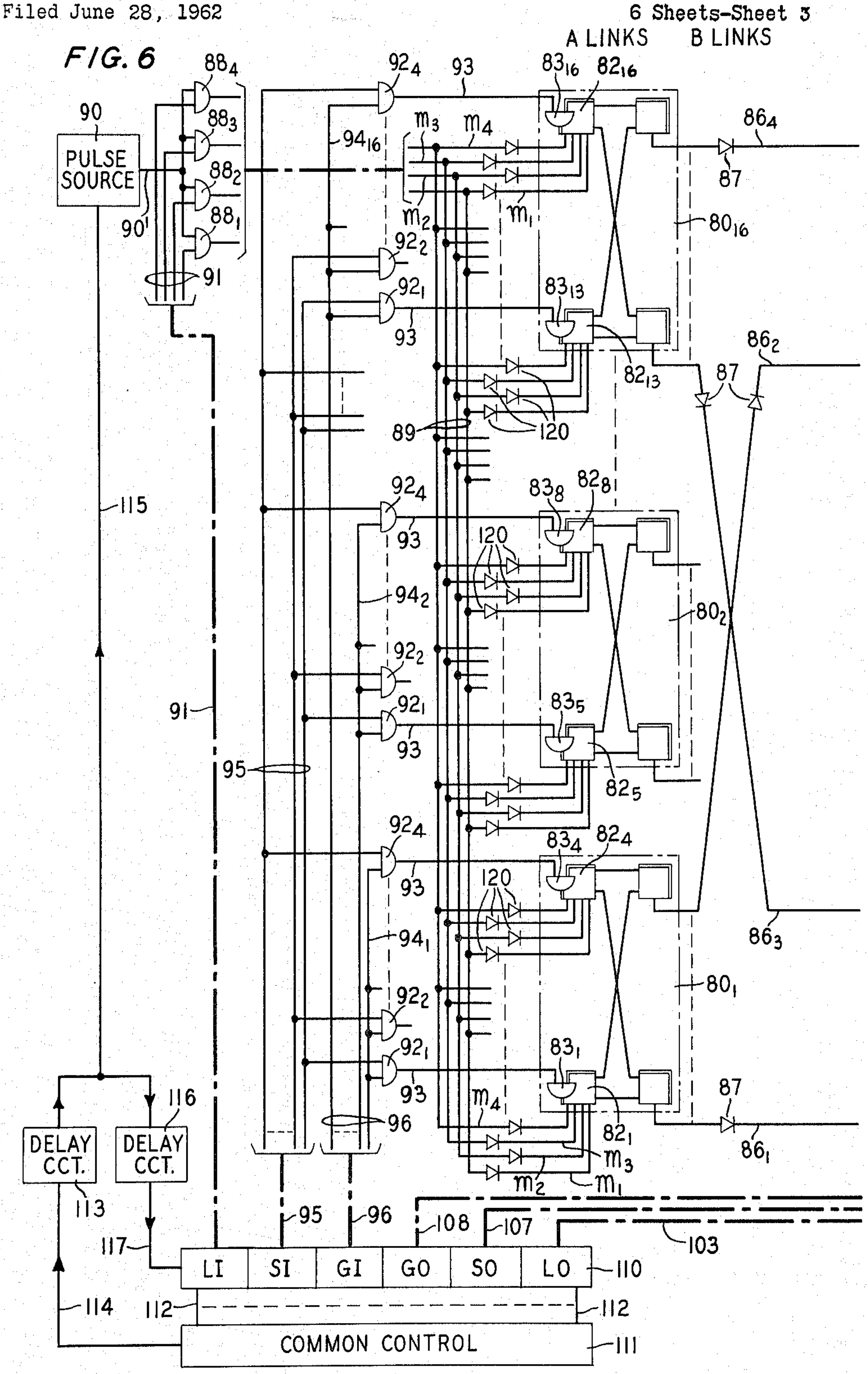
Figures 7, 11, 13:
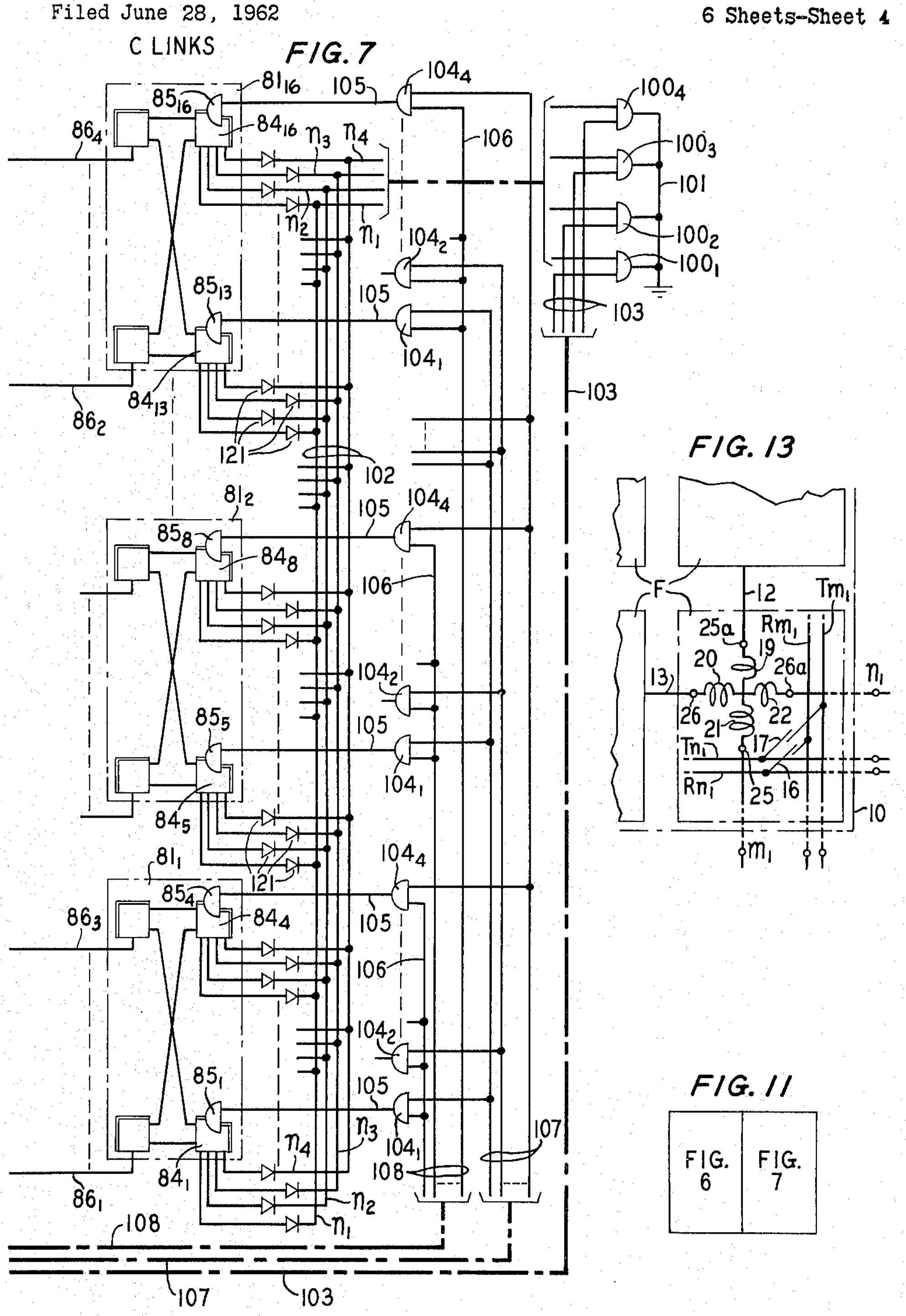
Figure 8:
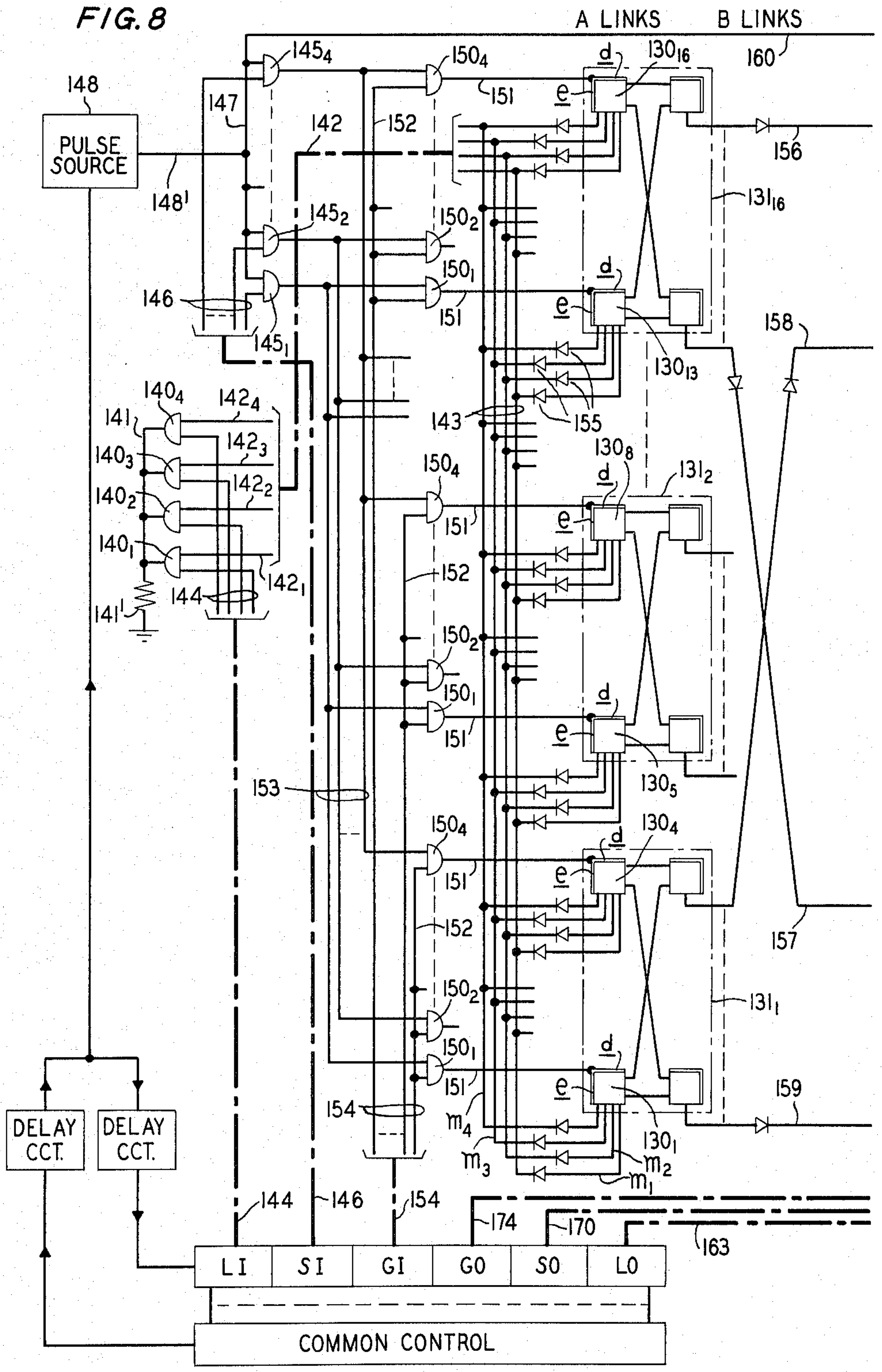
Figure 9:
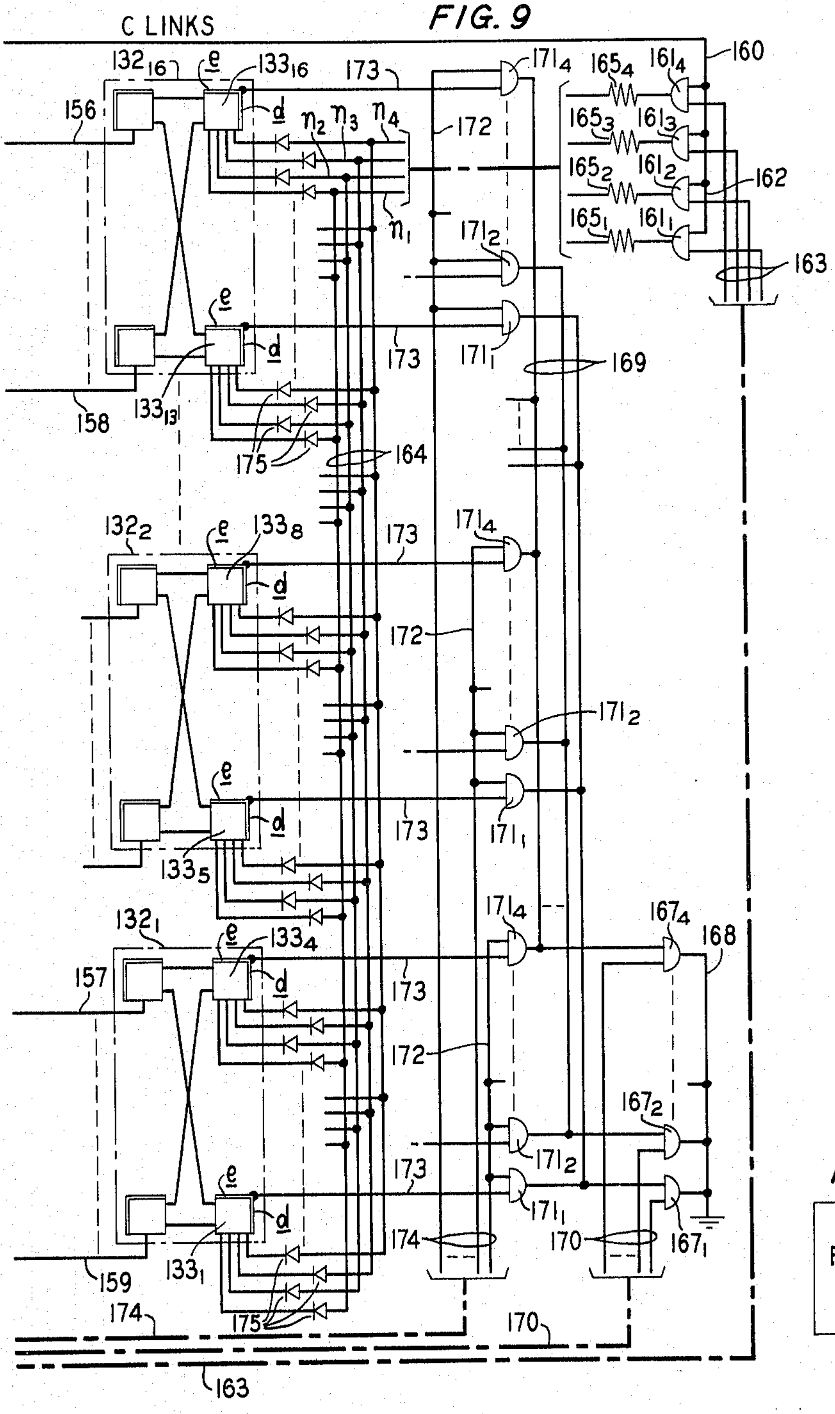
Figure 12:
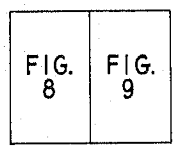

FIGS. 6 and 7 taken together depict the organization of another specific illustrative switching network according to the principles of this invention;

FIGS. 8 and 9 taken together depict the organization of still another specific illustrative switching network according to the principles of this invention;

FIG. 10 is a simplified schematic representation of the shunted conducting bus arrangement employed in the network of FIGS. 8 and 9;

FIG. 11 shows the arrangement of FIGS. 6 and 7 to depict the illustrative switching network there shown;

FIG. 12 shows the arrangement of FIGS. 8 and 9 to depict another illustraive switching network there shown; and FIG. 13 is a schematic representation of the connection of a typical ferreed crosspoint device, such as that shown in FIG. 2, in the typical coordinate crosspoint switch of FIG. 1.

The basic switching arrangement for establishing transmission paths through the network of this invention is shown in FIG. 1 and comprises a coordinate array switch 10 having a ferreed 11 at each of its crosspoints. The switch 10 comprises a 4 x 4 array and this capacity will be assumed in each of the switches to be described hereinafter. However, it is obvious that any number of crosspoints and coordinates may be employed to increase the capacity of the network according to this invention. The switch 10 is substantially of the character described in the copending application of Hayward, now Patent 3,110,-772 referred to in the foregoing and each of the ferreeds 11 has its control windings wound for differential excitation operation. The $m$ and $n$ coordinates of the switch 10 are defined by two sets of coordinate control conductors 12 and 13 each of which serially includes corresponding ones of the control windings of the fereeds 11. Each coordinate control conductor 12 and 13 may have coordinate transmission conductors (not shown) discretely associated therewith. The transmission conductors are not shown in FIG. 1 for purposes of simplicity; however, they are described later herein with reference to FIG. 13. The output and input ends of the coordinate $m$ and $n$ control conductors 12 and 13, respectively, are connected to a common conducting bus 14.

The individual ferreeds 11 of the switch 10, which are shown in block symbol form in FIG. 1, may advantageously take the form of the differentially wound parallel ferreed shown and described in the above-mentioned Lowry patent. However, any form of crosspoint switch operating in the coincident current excitation mode may be employed in the switch 10. Thus, in FIG. 2 is shown a ferreed advantageously adaptable for use as a crosspoint in the network of this invention. The ferreed, shown in simplified form in FIG. 2, is described in detail in the copending application of A. L. Blaha et al., Serial No. 124,723, filed July 17, 1961, now Patent 3,075,059 issued January 22, 1963, and for purposes of describing its operating aspects comprises a slotted magnetic sleeve 15 of a material having substantially rectangular hysteresis characteristics through which sleeve 15 are passed magnetically responsive reed contact members. Since the telephone switching network of this invention contemplates the simultaneous completion of ring and tip transmission circuits, to reed contact member pairs 16 and 17 are provided in the ferreed of FIG. 2. A magnetically permeable collar 18 encircles the sleeve 15 at approximately its midpoint and opposite the contacts of the reed members 16 and 17 within the sleeve. Each portion of the sleeve 15 defined by the collar 18 has a pair of windings coupled thereto. The portion $a$ of the sleeve 18 has a winding 19 and a winding 20 thereon and the portion $b$ has a winding 21 and 22 thereon. The windings 19 and 20 are wound in the same sense to the sleeve 18 but in the opposite sense to the windings 21 and 22, which latter windings are also wound in the same sense. The winding 19 is connected in series opposing with the winding 21 in an energizing circuit 23 and the winding 20 is connected in series opposing with the winding 22 in an energizing circuit 24. The windings 19 and 22 each have a smaller number of turns than each of the windings 20 and 21 in accordance with the differential excitation mode of operation which may now be briefly described.

Since this mode of operation, it will be recalled, depends on the simultaneous energization of the two sets of control windings 19–20 and 21–22, it will be assumed that a positive current pulse is applied simultaneously to each of the circuits 23 and 24, specifically to the respective terminals of these circuits designated 25 and 26. From the sense of the windings 20 and 21 and the polarity of the applied energizing pulse it will be apparent that a remanent magnetization will be induced responsive thereto in the sleeve 18 which is upward as viewed in the drawing. This magnetization will be equally distributed along the sleeve 18 and will find closure through the magnetic reed contact members 16 and 17 thereby effecting their closure. The energizing pulse will also be applied to the oppositely wound windings 19 and 22 thereby generating a counter magnetomotive force to the force inducing the foregoing magnetization. However, the number of turns of the latter windings is determined such that this magnetomotive force is overridden by the force generated in the windings 20 and 21 having a larger number of turns. Advantageously the remanent properties of the sleeve 18 permit the flux induced therein to operate on the relatively slower responding reed contact members 16 and 17 after the energizing current pulses are removed frim the terminals 25 and 26. These remanent properties also maintain the contacts of the reed members permanently closed without further expenditure of power.

Release of the contacts is accomplished by applying an energizing current pulse to either one but not both of the energizing circuits 23 and 24. Assuming that such a positive current pulse is applied to only the circuit 23 at its terminal 25, a magnetomotive force in the upward direction as viewed in the drawing will be generated in the winding 21 and such a force in the downward direction will be generated in the winding 19. In the portion $b$ of the sleeve 18 to which the winding 21 is coupled, the magnetization is already upward as a result of the previously described operation, and accordingly no effective magnetic change takes place in this portion $b$. In the portion $a$, however, the previously induced magnetization is switched to the opposite direction. Since no energizing current pulse is being applied at this time to the circuit 24, no magnetomotive forces counter to those just described are generated in the windings 20 and 22. The flux closure of the oppositely directed magnetizations as a result of the single applied current pulse will now be through the shunting collar 18 and through single ones of the reed contact member pairs. As a result, the magnetic poles at the contacts of the members 16 and 17 will be alike, thus causing their separation. It will thus be seen that when only one of the energizing circuits 23 and 24 is energized, one of the portions $a$ or $b$ will have the magnetization switched therein depending upon which one of the circuits 23 and 24 has a current pulse applied thereto. It is obviously immaterial which one alone is thus energized since in either case the contacts will be opened. The ferreed device of FIG. 2 is readily adapted to the crosspoint switch of FIG. 1 as shown in FIG. 13 by, for example, connecting the terminals 25 and 25$a$ in series with an $m$ coordinate control conductor 12 and by connecting the terminals 26 and 26$a$ in series with an $n$ coordinate control conductor 13 with the terminal 26 at the bus 14 side. The contact terminals 16, 16$a$, 17 and 17$a$ are respectively connected to the coordinate transmission conductors $Rm_1$, $Rn_1$, $Tm_1$ and $Tn_1$ as shown in FIG. 13. The coordinate transmission conductors $Tn_1$ and $Rn_1$ are associated with coordinate control conductor $n_1$ and the coordinate transmission conductors $Tm_1$ and $Rm_1$ are associated with the coordinate control conductor $m_1$. The energization of coordinate control conductors $m_1$ and $n_1$ causes coordinate transmission conductors $Mm_1$ and $Tn_1$, $Rn_1$ and $Rm_1$ to the connected together respectively by the contacts 17 and 16 of the ferreed crosspoint F11 defined by the coordinate intersection of the energized coordinate control conductors $m_1$ and $n_1$. The transmission conductors T and R are not shown in the remainder of the drawing; it being understood that each $m$ and $n$ coordinate control conductor of a switch array may have coordinate transmission conductors T and R associated therewith and interconnectable by the ferreed crosspoint defined by the respective coordinate intersections of the $m$ and $n$ coordinate control conductors. In the switch networks to be described, an individual crosspoint switch will be arranged so that its excitation is applied at an $m$ coordinate control conductor, the $n$ coordinate control conductors thus constituting in each case the output side. With this general review of the coordinate switch array of FIG. 1 and the series ferreed device of FIG. 2, in which the magnetic control paths are arranged in series, the broader organization of a switching network according to the principle of this invention may now be developed.

Figure 3:
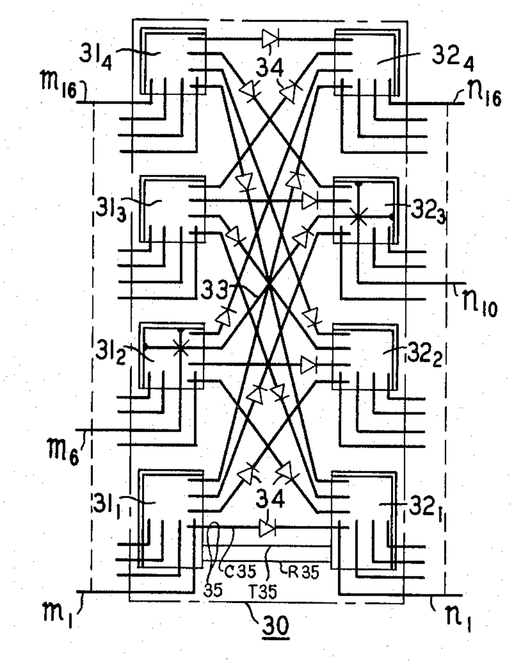
FIG. 3 depicts in simplified form the organization of a grid array comprising one organizational unit of the switching networks according to this invention.

The next step in the organization of a switching network according to this invention may best be understood by reference to FIG. 3. In that figure is shown a grid arrangement of switches and comprises an interconnection of four switches of a primary stage with four switches of a secondary stage. Although four switches in each stage are shown, this number is chosen in order to complete the interstage connections to be described in view of the number of crosspoints making up each exemplary switch array. Obviously the capacity of a network of this invention may be increased, as mentioned previously, by increasing the number of switch crosspoints coupled with a corresponding increase in the number of switches per stage. A grid 30 of FIG. 3 is shown in only sufficient detail to understand its organization and the interstage connections and comprises in the primary stage four switches $31_1$ through $31_4$. The secondary stage is similarly made up of four switches $32_1$ through $32_4$. Each of the switches 31 and 32 comprises a switch as shown in FIG. 1 having at each of its crosspoints a ferreed device as shown and FIG. 2 and connected as shown in FIG. 13. Accordingly the switches 31 and 32 also have $m$ and $n$ coordinate control conductors having connected in series therewith the respective control windings sets of the individual ferreeds as shown in FIG. 13 and described hereinbefore. The $m$ coordinate control conductors of the grid 30 are grouped as input control conductors $m_1$ through $m_{16}$ and the $n$ coordinate control conductors are grouped as output control conductors $n_1$ through $n_{16}$.

The output control conductors $n$ of the switches 31 are connected to the input control conductors $m$ of the switches 32. The coordinate transmission conductors (not shown) associated with the output control conductors $n$ of the switches 31 may be connected to the coordinate transmission conductors (not shown) associated with the input control conductors $m$ of the switches 32. A typical connection is illustrated by the conductors 35 which include two transmission conductors T35 and R35 and a control conductor C35. Hereinafter, only the control connections will be shown in the drawing; it being understood that paralleling transmission conductors associated therewith may be provided. The interswitch control conductors will be referred to as "links." These connections are made in a manner so that each of the primary stage switches 31 has access to all of the secondary stage switches 32. The interstage control connections is carried out by successively connecting the $n$ control conductors of each primary stage switch 31 with the corresponding $m$ control conductors of the secondary stage switches 32. Thus, for example, the first through fourth $n$ control conductors of the first primary stage switch $31_1$ are connected respectively to the first $m$ control conductor of each of the secondary stage switches 32. The first through fourth $n$ control conductors of the second primary stage switch $31_2$ are connected respectively to the second $m$ control conductor of each of the secondary stage switches 32. This manner of interconnection is continued with the connection of the first through fourth $n$ control conductors of the last primary stage switch $31_4$ respectively to the last $m$ control of each of the secondary stage switches 32. With the symmetrical interstage connections thus resulting, it is clear from an inspection of FIG. 3 that any input control terminal of the primary stage of the grid 30 via an $m$ control conductor of a switch 31, has access to any switch 32 and thereby to any output control terminal of the $n$ control conductors of the secondary stage. A control connection within each of the switches 31 and 32 is made via its common conducting bus symbolized in FIG. 3 by the doubled lined sides of the block symbols.

In the grid arrangement of FIG. 3, a unique, continuous control path is available from any $m$ input control conductor of the primary stage to any $n$ output control conductor of the secondary stage. This unique control path is completely defined without internal selection merely by specifying an $m$ and $n$ control terminal of the grid. If a current pulse is applied to the input of a selected one of the $m_1$ through $m_{16}$ control conductors of the primary stage simultaneously with the application of ground potential to the output of a selected one of the $n_1$ through $n_{16}$ control conductors of the secondary stage, the pulse will be conducted along the predetermined series control path specified by the selected $m$ and $n$ control terminals of the grid. In the control path, the current pulse will be simultaneously applied to the control winding sets of the ferreed cross-points defined by the selected $m$ and $n$ control conductors of the two stages. Specifically, if a current pulse is applied, for example, to the input terminal of control conductor $m_6$ appearing at switch $31_2$ of the primary stage at the same time that a ground potential is applied to the output terminal of conductor $n_{10}$ appearing at switch $32_3$ of the secondary stage, then a series control path including the control link 33 is positively identified between the two stages. Energization of this control path initiates establishment of the paralleling transmission path. Only one link connects the switches $31_2$ and $32_3$ and this link connects the third level of the former switch with the second level of the latter. Each of the crosspoints of the two switches on these levels is thus identified by the link 33. Specific crosspoints on these levels are identified by specifying the $m$ and $n$ control conductors of the primary and secondary stages, respectively. This positive identification of an internal link and a series control path once the end control terminals of the grid are specified, in accordance with this invention, is advantageously made possible by the permanent connections of the coordinate control conductors of the switches to the common conducting busses. Each of the links connecting the switches of the primary and secondary stages of the grid 30 has a unilateral conducting element 34 therein to prevent sneak control paths and thereby to insure complete isolation of the unique series control paths.

Figure 4:
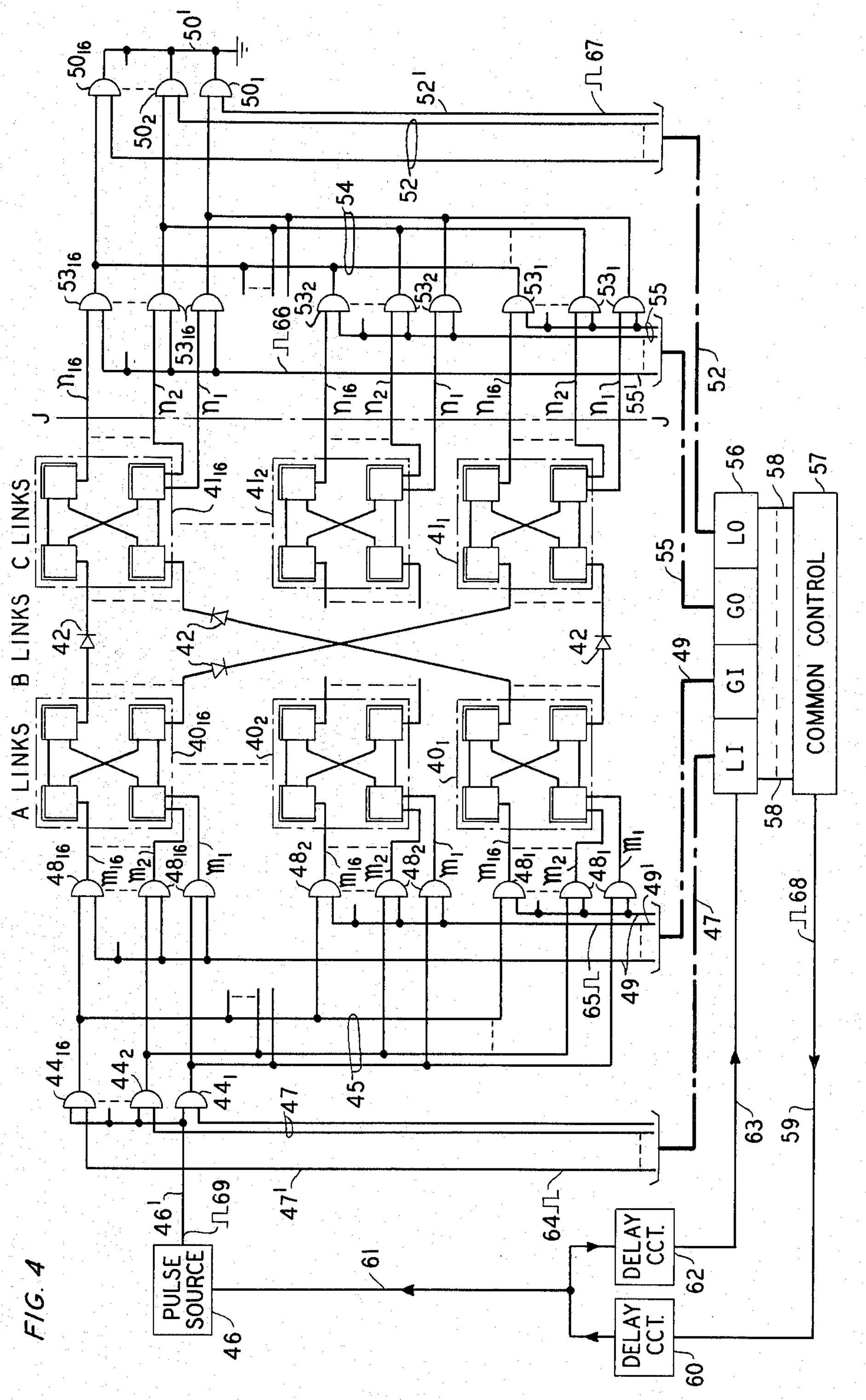
FIG. 4 depicts the organization of one specific illustrative switching network according to the principles of this invention.

One specific illustrative telephone switching network according to this invention made up of the aforedescribed switches and grids is depicted in FIG. 4. The network of FIG. 4 comprises a first and a second plurality of grids $40_1$ through $40_{16}$ and $41_1$ through $41_{16}$, each of which grids is made up of switches in the manner described in connection with the grid of FIG. 3. The network of FIG. 4 is thus made up of four stages of switches, the first and second stage switches being interconnected in grids 40 and the third and fourth stage switches being interconnected in grids 41. The interstage connections between the switches in the grids is made in the manner previously described in connection with the grid of FIG. 3, the links interconnecting the primary and secondary switches of the grids 40 and 41 being designed A and C links, respectively. Transmission conductors (not shown) may parallel the respective links. Access to each of the "A link" grids 40 is had by means of a plurality of input control conductors $m_1$ through $m_{16}$ and the output of each of the "C link" grids 41 is taken from a plurality of output control conductors $n_1$ through $n_{16}$.

The interconnections between the grids 40 and 41 are made by means of B links in a manner identical to that for interconnecting the switches within a grid. Thus, the connections are made so that each of the "A link" grids 40 has access to all of the "B link" grids 41. This intergrid connection is carried out by successively connecting the output control and transmission conductors of each of the A link grids 40 with the corresponding input control and transmission conductors of the C link grids 41. For example, the output control conductors of the grid $40_1$ are successively connected to the first input control conductor of each of the grids $41_1$ through $41_{16}$, the output control conductors of the grid $40_2$ are susccessively connected to the second input control conductor of each of the grids $41_1$ through $41_{16}$, etc. This interconnection of B links is continued until the final connections of the output control conductors of the grid $40_{16}$ with the last input control conductor of each of the grids $41_1$ through $41_{16}$. Obviously, in this manner each of the input control conductors $m_1$ through $m_{16}$ of each of the grids 40 has a distinct control path available in the supergrid to any of the output control conductors $n_1$ through $n_{16}$ of each of the grids 41. As in the case of the A and C links, each of which is assumed to have a unilateral conducting element therein, which however is not shown in FIG. 4, each of the "B links" also has a unilateral conducting element 42 therein for purposes of control path isolation. The network of FIG. 4 is shown in only sufficient detail by means of representative grids, control conductors, and control links to provide a complete understanding of its organization.

It will be apparent that, in the case of the supergrid network just as in the smaller grid organization, the common conducting busses of the individual ferreed switch array make possible the complete identification of a series control path through the network once the two end control terminals $m$ and $n$ of the supergrid are specified. Although only one control path exists between any two $m$ and $n$ control terminals, each of the A, B, and C links may be employed to establish a number of control paths between different end control terminals. Thus referring back to FIG. 3, it is clear from the exemplary control path described that the link 33, for example, serves as a connection between each of the input control conductors $m_5$ through $m_8$ of the switch $31_2$ and each of the output control conductors $n_9$ through $n_{12}$ of the switch $32_3$. Thus, if the transmission conductors associated with any one of the latter $m$ control conductors is connected to the transmission conductors associated with a selected one of the latter $n$ control conductors, via transmission conductors associated with the link 33, the latter transmission conductors will be unavailable for the completion of a transmission connection between the switches $31_2$ and $32_3$ between any of the transmission conductors associated with the other control terminals $m$ and $n$. The same exclusive assignment of interstage links exists in the larger organization of the supergrid network of FIG. 4. Any one of the A, B, and C links, if its associated transmission conductors are already employed to complete a transmission connection in the network between end transmission terminals, cannot be used to control the completion of other such transmission connections during the time that the previously established transmission connection is in use. This follows from the differentially excited ferreeds appearing at the crosspoints of the switches of the grids. The application of a current pulse to a ferreed appearing on the coordinate control conductor connected to a link whose associated transmission conductors are already in use serves to open the contacts of a ferreed previously operated on that coordinate and thereby disconnect the coordinate transmission conductors associated with the coordinate control conductors. The specification or "marking" of any two end control terminals thus destroys the transmission connection made in any ferreed appearing along the coordinates in which newly operated ferreeds also appear, hence the term "destructive mark."

As described previously, the common conducting bus of an individual ferreed switch array to which both groups of coordinate control conductors are connected advantageously makes possible the simultaneous energization of the differential winding sets of a selected ferreed within the switch. This also holds true as the ferreed switches are organized in progressively larger units. A single current pulse applied to a selected $m$ control conductor terminal of the supergrid, when accompanied by a ground potential applied to a selected $n$ control conductor terminal, simultaneously energizes the differential winding sets of a predetermined ferreed in a switch in each of the four stages, causing their respective contacts to close and a transmission path to be established through all stages of the network.

In accordance with another aspect of this invention, selection of the two end control terminals of the supergrid network and the application of energizing signals thereto is accomplished by means of a tree arrangement of AND gates at each end of the supergrid. Selection at each end of the supergrid is made by selecting the levels of the A and C link grids on which the selected $m$ and $n$ control conductor terminals fall and also selecting the particular A and C link grids in which the selected levels occur. Level selection at the input side of the supergrid network of FIG. 4 is accomplished by a plurality of two-input level AND gating means $44_1$ through $44_{16}$ associated respectively with the levels of the individual grids 40 represented by the control conductors $m_1$ through $m_{16}$. The output ends of the gating means $44_1$ through $44_{16}$ specifically are multiplied by means of conductors 45, respectively, to inputs of grid AND gating means 48, and thence to the control conductors $m_1$ through $m_{16}$ of each of the grids 40. One input of each of the gating means 44 is connected directly to a current pulse source 46 via a conductor 46'. A control input of each of the gating means 44 is connected via a control conductor 47 to selector control circuitry to be described hereinafter.

Grid selection at the input side of the supergrid network is accomplished by a plurality of two-input grid AND gating means 48 individually connected to the $m$ control conductors of each of the girds 40. One input of each of the gating means 48 is connected via the multiple conductor 45 to the output side of its level gating means 44. The other control inputs of the gating means 48 are grouped by grids, the control inputs of the gating means 48 of each grid being connected together and to a control conductor 49 also leading to selector control circuitry to be described. Sixteen control conductors 47 thus provide the means for enabling the gating means 44 for selecting one of the sixteen levels of the grids 40 and sixteen control conductors 49 provide the means for enabling a particular group of gating means 48 for selecting one of the sixteen grids 40. A current path may thus also be traced from the pulse source 46 via the conductor 46' through one of the level gating meaens 44 to any one of the gating means 48 via a multiple conductor 45 and thence to a selected input control conductor $m$ terminal.

The selector access circuitry as well as the internal organization of the supergrid network is symmetrical. The output selector tree arrangement of gating means is thus identical to that described in connection with the input selector tree of the supergrid. The selection at the output side of the supergrid is made to connect ground potential to an $n$ output control conductor of the grids 41 simultaneously with the applicattion of an energizing pulse from the source 46 to a selected $m$ input control conductor of the grids 40 to complete a circuit path for the energizing pulse. Level selection at the output side of the supergrid network of FIG. 4 is accomplished by a plurality of two-input level AND gating means $50_1$ through $50_{16}$ associated respectively with the levels of the individual grids 41 represented by the output control conductors $n_1$ through $n_{16}$. The output of each of the gating means 50 is connected directly to a source of ground potential via a conductor 50'. A control input of each of the gating means 50 is connected via a control conductor 52 also to selector control circuitry to be described hereinafter.

Grid selection at the output side of the supergrid network is accomplished by a plurality of two-input grid AND gating means 53 for each of the grids 41. One input of each of the gating means 53 is individually connected to the $n$ control conductors of each of the grids 41. The output of each of the gating means 53 is connected via a multiple conductor 54 to the input side of its level gating means 50. The other control inputs of the gating means 53 are grouped by grids, the control inputs of the gating means 53 of each grid being connected together and to a control conductor 55 also leading to selector control circuitry to be described. Sixteen control conductors 52 thus provide the means for enabling the gating means 50 for selecting one of the sixteen levels of the grids 41 and sixteen control conductors 55 provide the means for enabling a particular group of gating means 53 for selecting one of the sixteen grids 41. A current path may thus also be traced from any one of the *n* output control conductors through a grid gating means 53 to one of the level gating means 50 via a multiple conductor 54 and thence to ground.

Although any suitable gating means may be employed for the elements 44, 48, 50, and 53 as are well known in the art, pnpn transistor triodes were found to be particularly applicable for controlling the current path through the selector trees. Four sets of control conductors 47, 49, 52, and 55 are selectively energized to determine a conducting path through the input and output selector trees of the supergrid network as described in the foregoing. These groups of conductors and their associated circuitry may be designated LI, GI, GO, and LO, respectively. External circuitry for controlling the selective enabling of the gates of the selector trees at the same time that the current pulse source 46 is energized will be readily envisioned by one skilled in the art and the supergrid network of this invention and its associated selector trees are readily adapted for use in connection with known electronic telephone switching systems. One illustrative system is shown in FIG. 4 in simplified block symbol form only and comprises a register 56 for providing the binary signals required for enabling selected gating means of the input and output selector trees. The register 56 may be divided into sections LI, GI, GO, and LO, corresponding to the groups of control conductors connected to the groups of level input, grid input, grid output, and level output gating means, respectively, of the selector trees. Each section of the register 56 may conveniently comprise a plurality of well-known flip-flop circuits each having a binary "1" and "0" output. Single rail logic may be achieved for the energized states of the selector conductors 47, 49, 55, and 52 by connecting the latter only to the binary "1" outputs of the flip-flops.

The register circuit 56 is in turn controlled by, and receives its selection instructions from, a common control circuit 57 which may advantageously comprise the common control of the telephone system with which the present invention may be adapted for use. At the same time that control signals are selectively applied via control leads 58 from the common control circuits 57 to the selection register 56, another control signal is also applied from the common control 57 to the pulse source 46. The latter control signal is delayed by means of a suitable delay circuit 60 to which it is conducted via a lead 59 and is transmitted therefrom to the pulse source 46 via a lead 61. The operation of the latter delay circuit 60 permits a stabilization of the selection register 56 to insure the proper enabling of level and grid gating means in the selector trees simultaneously with the application of a drive current pulse to the selector trees. Resetting of the selection register 56 in preparation for a subsequent network selection operation may be conveniently achieved by means of the same control signal applied to energize the pulse source 46. The latter signal may be applied, after a suitable time interval introduced by a second delay circuit 62, to the flip-flops of the register 56 in common via a reset lead 63. Each of the delay circuits 60 and 62 comprises apparatus well known in the art and constitutes only illustrative means for achieving a selection within the selector trees of the network. Accordingly, these circuits are also shown only as block symbols in the drawing.

An illustrative operation of the network of FIG. 4 in which particular A, B, and C links are selected and their paralleling transmission conductors are connected; in the supergrid merely by the specification and marking of its input and output control terminals may now be described. Although only one control and transmission path exists through the network for any two input and output terminals, any one link and its associated transmission conductors may be employed for a number of such paths as was previously discussed. Accordingly, although the transmission paths associated with particular input and output control terminals of the supergrid may be idle, the transmission conductors associated with a link or links interconnecting the two control terminals may not be. If a transmission path associated with such a link is busy with such a link is busy and the link is then seized during a network control operation, any ferreeds located in the coordinate of the switches to which the link is connected will be restored to a released condition and their contacts opened. Accordingly, it will be assumed for purposes of describing an illustrative operation of the network of FIG. 4, that an external memory, not shown in the drawing, is provided in association with the common control circuit 57 to record the busy and idle condition of the transmission paths associated with the A, B, and C links. The common control circuit 57, responsive to information received from the memory regarding the busy-idle condition of the various network transmission paths, then controls the selection of the interstage links to prevent the destruction of the network transmission connections established during previous operations.

Assuming the selection of the interstage links for controlling the establishment of a transmission connection through the network as determined by external memory circuits and common control, it will further be assumed for purpose of illustration that positive enabling signals 64 through 67 are selectively and simultaneously applied from the register circuit 56 to the conductors 47′, 49′, 55′, and 52′, respectively, controlling the level and grid inputs and the grid and level outputs. These signals it will be demonstrated, are effective to specify the supergrid input control terminal $m_{16}$ of grid $40_2$ and supergrid output control terminal $n_1$ of grid 41. As a result of the enabling signal 64 applied to the conductor 47′, the level gating means $44_{16}$ is enabled thereby providing primary access to the input coordinate control conductors $m_{16}$ of each of the grids $40_1$ through $40_{16}$. The enabling signal 67 applied to the conductor 52′ at the other side of the supergrid enables the level gating means $50_1$ thereby providing a secondary outlet to ground for the output coordinate control conductors $n_1$ of each of the grids $41_1$ through $41_{16}$. The particular $m_{16}$ input coordinate control conductor of the grids 40 and the particular $n_1$ output coordinate control conductor of the grids 41 between which the series control path through the supergrid is to be established is determined by the enabling signals 65 and 66. The latter signals are applied to the conductors 49′ and 55′, respectively, to enable each of the input grid gating means $48_2$ associated with the grid $40_2$ and each of the output grid gating means $53_{16}$ associated with the grid $41_{16}$. As a result of the input and output current paths thus provided by the paths selected in the input and output gating trees, the supergrid network of FIG. 4 in turn provides one exclusive series control path therethrough between the specified input and output control terminals $m_{16}$ and $n_1$ of the grids $40_2$ and $41_{16}$, respectively, for a drive current pulse from the pulse source 46.

The pulse source 46 is also energized under the control to the common control circuit 57 which circuit provides for the application of a control signal 68 to the conductor 59 simultaneously with the application of the control signals to the register 58 to supply the enabling selection signals 64 through 67. The control signal 68 is delayed by the delay circuit 60 for a suitable interval to insure that the flip-flop register 56 has sufficiently stabilized to accomplish complete gating in each level of the selector trees. After suitable delay, the current pulse 68 is applied via the conductor 61 to energize the pulse source 46 which in turn applies a drive current pulse 69 to the output conductor 46'. The pulse 69 has available only the conducting path of the branch including the enabled gating means $44_{16}$ after which the pulse 69, as described previously, is applied to each of the gating means 48 which has access to an $m_{16}$ input coordinate control conductor. Since only the grid gating means $48_2$ are enabled, the current pulse is applied to the input coordinate control conductor $m_{16}$ of grid $40_2$.

Within the supergrid network of FIG. 4, the current pulse 69 will be conducted by means of the only isolated path from the input control conductor $m_{16}$ of the grid 40 to the output control conductor $n_1$ of the grid $41_{16}$ via the common conducting busses of the individual ferreed switches and interstage links. The connecting A, B, and C interstage links are established after the specification of the input and output control terminals of the supergrid in accordance with the organization of the switches, grids, and supergrid previously described. Thus, the "B link" selected is the only such link connecting the grid $40_2$ and the grid $41_{16}$. In accordance with the foregoing internal organization of the supergrid, in the illustrative operation being described, the selected "B link" is the link connecting the 16th level output coordinate control conductor of the grid $40_2$ with the 2nd level input coordinate control conductor of the grid $41_{16}$. In a similar manner only one A and only one C link internally connects the switches of the grids $40_2$ and $41_{16}$, respectively, to which the input and output coordinate control conductors $m_{16}$ and $n_1$, respectively, are connected. The A, B, and C links, thus selected, which are not specifically shown in the drawing, also define the particular crosspoints within each of the switches of the grids at which individual ferreeds are operated. Since each of these ferreeds includes two pairs of magnetically responsive contacts, a transmission connection including ring and tip conductors of a telephone transmission circuit associated with input control conductor $m_{16}$ may be completed with the network of this invention.

At the output side of the supergrid network, the enabled grid output gating means $53_{16}$ and level output gating means $50_1$ provide the path to gorund for the drive pulse 69. It may be noted here and as previously explained, that in accordance with destructive mark operation, each of the ferreeds having a winding connected in a coordinate control conductor constituting a segment of the control path between the selected A, B, and C links which was operated during a previous selection operation, will be restored to it normally released condition and its contacts opened. When each of the crosspoint ferreeds has been operated its contacts are maintained in the closed condition by the remanent properties of the square loop magnetic sleeve encircling the contacting members, after the current pulse 69 is terminated. The control pulse 68 initially energizing the pulse source 46 is applied at the same time to the delay circuit 62 whereupon, after suitable delay as determined by specific apparatus considerations, the pulse 68 is applied via the conductor 63 to the register 56 flip-flop to reset each of the connected selecting conductors to the unenergized state.

From the organization and operation of the differentially excited ferreed employed in the switches of this invention and as depicted in FIG. 2, precisely timed coincident curent pulses are required to operate the contacts. Further these current pulses must also substantially coincide in magnitude to insure the operation of a ferreed. And disparity in the timing may merely cause a selected crosspoint ferreed to open its contacts, if previously closed, or to maintain them open, if previously open. This requirement is advantageously met in accordance with this invention, not only with respect to individual switches, but also when the switches are multiplied into grids and supergrids such as described in connection with the network of FIG. 4. As described in the foregoing, a single drive current pulse 69 operates simultaneously each of the selected crosspoint ferreeds within each of the switches and grids of the supergrid. Obviously, the requirement of coincidence of magnitude is also met by this network organization.

In order to adapt at the supergrid of FIG. 4 to a larger network made up of two supergrids, for example, as mentioned previously, another identical supergrid may be connected at the junction designated J—J in FIG. 4. In such a case the $n$ output control terminals of the supergrid of FIG. 4 would be connected to the $m$ input control terminals of the second supergrid not shown. The larger network thus resulting would still be endmarked, that is, the input and output control terminals of the network would still be selected by the selector trees at each end of the network as described in connection with the embodiment of FIG. 4. However, an additional selection stage would in that case be provided for in the connecting junctors of the two supergrids. This additional selection may advantageously be accomplished by means of relay contacts in the junctors also operated under instructions from the common control 57.

Figure 5:
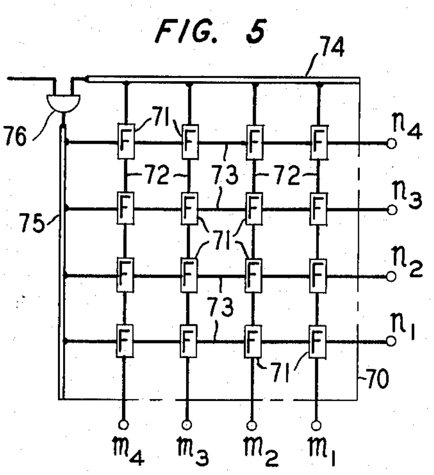
FIG. 5 depicts a modification of the coordinate ferreed crosspoint switch shown in FIG. 1 which modified switch is employed as the basic switching element of the illustrative switching network depicted in FIGS. 6 and 7.

Another specific illustrative switching network according to the principles of this invention, and one which adds a selection stage at each end, is depicted in FIGS. 6 and 7. In the network of FIG. 4, it will be recalled, only a grid selection and level selection within the grid at each end of the network are provided for. In the network of FIGS. 6 and 7, grid selection switch selection within the grid, and level selection within the switch, at each end of the network are made possible by the employment as the basic ferreed switch, a modification of the switch depicted in FIG. 1. This modification, shown in FIG. 5, comprises the insertion of an AND gate in the common conducting bus. The switch 70 of FIG. 5 also comprises a 4 x 4 array having at its crosspoints a ferreed switch identical to that considered in the switch of FIG. 1, and which also may advantageously comprise a specific form of the ferreed device shown in FIG. 2. Each of the ferreed devices 71 also has its control windings wound for differential excitation operation. The $m$ and $n$ coordinates of the switch 70 are defined by two sets of coordinate control conductors 72 and 73, each of which serially includes corresponding ones of the two control winding sets of the ferreeds 71. The output ends of the coordinate control conductors $m$ are connected to one common conducting bus 74 and the input ends of the coordinate control conductors $n$ are connected to another common conducting bus 75. A two-input AND gating means 76 is connected with its output connected to one end of the common conducting bus 75. One of the inputs of the gating means 76 is connected to one end of the common conducting bus 74. The other input of the gating means 76 is provided as a control to establish electrical continuity between the two busses 74 and 75. Conducting paths may be traced from any input control terminal $m_1$ through $m_4$ of the $m$ coordinate control conductors to any output control terminal $n_1$ through $n_4$ of the $n$ coordinate control conductors via the conducting bus 74, gating means 76, and conducting bus 75 provided the gating means 76 is enabled. If the gating means 76 is not enabled, the control terminals $m_1$ through $m_4$ and $n_1$ through $n_4$, and thus the two control winding sets of each of the ferreeds 71, will obviously be electrically isolated. It will be appreciated that if a current path through the switch 70 is required in the opposite direction, that is, from the $n$ control terminals to the $m$ control treminals, the gating means 76 will be reversed in direction.

The switches 70 of the network of FIGS. 6 and 7 are not specifically shown to avoid complexity; however the switches 70 are also organized into grids as described previously. The grid organization of the present network is substantially similar to that depicted in FIG. 3 and also comprises an interconnection of four switches of a primary stage with four switches of a secondary stage. As in the earlier grid described, although four switches in each stage are assumed, this number is chosen in order to complete the interstage connections to be described in view of the number of crosspoints making up each exemplary switch array. Each of the grids of the network of FIGS. 6 and 7 is provided with four sets of $m_1$ through $m_4$ input control terminals and each of the grids has four sets of $n_1$ through $n_4$ output control terminals. The interconnection between the primary and secondary stages of the grid being considered are carried out in a manner identical to that depicted in FIG. 3 and each of the switches of the secondary stage is identical to the switch depicted in FIG. 1 and used throughout the network of FIG. 4. The only difference between the grids employed in the latter network and the grids presently being considered is the use of the gated switch of FIG. 5 in one of the stages of the grid as determined by the end of the network at which the grid appears. In the present grid organization it is again important to note that a unique, continuous series control path may be established from any $m$ input control terminal of the primary stage to any $n$ output control terminal of the secondary stage. However, in the grid being considered it is not alone sufficient to select only the $m$ input control terminal and the $n$ output control terminal positively to determine the unique control path. In the present grid it is also necessary, in addition to selecting a terminal at one side of the grid, to enable a bus gating means in a switch of one of the stages of the grid in order to establish the unique control path. An alternate organization of a switching network according to the principles of this invention which employs a grid arrangement thus briefly described, may now be considered.

The network arrangement of FIGS. 6 and 7 comprises a first and a second plurality of grids $\mathbf{80}_1$ through $\mathbf{80}_{16}$ and $\mathbf{81}_1$ through $\mathbf{81}_{16}$. Although the switches are shown in symbolic form only each of the grids 80 and 81 is understood to be made up of switches of the character depicted in FIGS. 1 and 5. The network is also made up of four stages of switches, the first and second stage switches being interconnected in grids 80 and the third and fourth stage switches being interconnected in grids 81. Each of the switches of the first and fourth stages of the network of FIGS. 6 and 7 comprise switches of the character depicted in FIG. 5 and each of the switches of the second and third stages comprises switches of the character depicted in FIG. 1. The interstage connections between the switches in the grids is made in the manner identical to that previously described in connection with the grid of FIG. 3, the links interconnecting the primary and secondary switches of the grids 80 and 81 again being designated A and C links, respectively. Transmission conductors (not shown) may parallel the A and C links as previously described. Each of the primary switches 82 of the grids 80 has a gating means 83 corresponding to the gating means 76 of FIG. 5 which connects portions of the conducting bus as described in connection with the switch depicted in FIG. 5. Access to each of the A link grids 80 is had by means of a plurality of input control conductors connected to four sets of control terminals $m_1$ through $m_4$, which terminals have been shown in the drawing merely as conductors for purposes of simplicity. Each of the secondary switches 84 of the grids 81 also has a gating means 85 corresponding to the gating means 76 of FIG. 5 which connects portions of the conducting bus as described in connection with the switch described in FIG. 5. The output of each of the C link grids 81 is taken from a plurality of output control conductors connected to four sets of control terminals $n_1$ through $n_4$, which terminals are also shown as conductors in the drawing.

The interconnections between the grids 80 and 81 are made by means of B links in a manner identical to that described for the B links of the network embodiment depicted in FIG. 4. Only representative ones of the B links are shown in FIGS. 6 and 7 designated $\mathbf{86}_1$ through $\mathbf{86}_4$. Each of the A, B, and C links has a unilateral conducting element connected therein; the unilateral conducting elements in the A and C links are not shown in the drawing to avoid complexity of detail, the unilateral conducting elements 87 being shown in the representative B links 86 to illustrate the connection in each of the links of the elements 87. It may be noted at this point that the network of FIGS. 6 and 7 is also shown in only sufficient detail by means of representative grids, conductors, and links to provide a complete understanding of its organization to one skilled in the art.

It will be apparent from the network details of the embodiment of FIGS. 6 and 7 so far described, that from the output control terminals of the primary stage switches of the A link grids to the input control terminals of the secondary stage switches of the C link grids, this network arrangement is identical to the corresponding portion of the network of FIG. 4. Thus from any one of the former output control terminals to any one of the latter input control terminals only one distinct control path exists.

In accordance with one aspect of this invention, selection of the two end terminals of the supergrid network of FIGS. 6 and 7 and the application of energizing signals thereto are accomplished by means of a tree arrangement of AND gates at each end of the supergrid. In the network presently being considered three stages of selection are provided for at each end of the supergrid. Selection at each end of the supergrid is made by selecting the level within each of the switches of each of the grids of the A and C link grids on which the selected $m$ and $n$ control conductor terminals fall, the particular switch within each of the grids within which the selected $m$ and $n$ control conductor terminals occur, and finally the particular A and C link grids in which the selected switch occurs. Level selection at the input side of the supergrid network of FIGS. 6 and 7 is accomplished by a plurality of two-input level AND gating means $\mathbf{88}_1$ through $\mathbf{88}_4$ corresponding respectively to the four levels of each of the switches 82 of the A link grids 80. The output ends of the gating means $\mathbf{88}_1$ through $\mathbf{88}_4$ specifically are multiplied respectively to the control conductor terminals $m_1$ through $m_4$ of each of the switches 82 of the grids 80 by means of conductors 89. One input of each of the gating means 88 is connected directly to a current pulse source 90 via a conductor 90'. A control input of each of the gating means 88 is connected via a control conductor 91 to level selector control circuitry to be described hereinafter.

Primary switch selection within each of the grids 80 at the input side of the supergrid network is accomplished by a plurality of two-input switch AND gating means $\mathbf{92}_1$ through $\mathbf{92}_4$ associated respectively with corresponding switches 82 of the grids 80. The output of each of the gating means 92 is connected via a control conductor 93 to one of the inputs of its associated bus gating means 83. The other input of each of the bus gating means 83 is connected to the common conducting bus of its switch 82 to which the input coordinate control conductors $m$ of the switch are also connected. One of the inputs of each of the switch gating means 92 associated with a particular grid 80 is connected to each of the corresponding inputs of the other gating means 92 so associated by means of a common conductor 94. The other input of each of the switch gating means 92 is connected to the corresponding input of the corresponding gating means 92 associated with the grids $\mathbf{80}_1$ through $\mathbf{80}_{16}$ and then via respective control conductors 95 to switch selector control circuitry to be described hereinafter.

Grid selection at the input side of the supergrid network is accomplished by means of the other inputs of the switch gating means 92. The latter inputs are associated in particular groupings by means of the common conductors 94. The latter conductors are each in turn connected to respective control conductors 96 to receive control signals from grid selector control circuitry to be hereinafter considered. In the network embodiment of FIGS. 6 and 7, four level gating means 88 and their associated control conductors 91 thus control the selection of the level within a switch 83 of a grid 80, 64 gating means 92, and one set of their associated control conductors 95 connected to one of the corresponding inputs control the selection of a switch 82 within a grid 80, and the other set of 16 control conductors 96 connected to other corresponding inputs of the gating means 92 via the common conductors 94 control the selection of the grid within which the selected switch and level appear.

The selector access circuitry as well as the internal organization of the supergrid network is symmetrical. The output selector tree arrangement of gating means is thus identical to that described in connection with the input selector tree of the supergrid. The selection at the output side of the supergrid is made to connect ground potential to an *n* output coordinate control conductor terminal of the C link grids 81 and specifically to the secondary stage switches 84 of the latter grids, simultaneously with the application of an energizing pulse from the source 90 to a selected *m* input coordinate control conductor terminal of the grids 80. Level selection at the output side of the supergrid network of FIGS. 6 and 7 is accomplished by a plurality of two-input level AND gating means $100_1$ thorugh $100_4$ corresponding respectively to the four levels of each of the switches 84 of the C link grids 81. The output ends of the gating means $100_1$ through $100_4$ are connected together and to ground or other potential via a common conductor 101. One corresponding input of each of the gating means 100 is multiplied respectively to the control conductor terminals $n_1$ through $n_4$ of each of the switches 84 of the grids 81 by means of conductors 102. The other corresponding input of each of the gating means 100 is connected via a control conductor 103 to output lavel selector control circuitry also to be described hereinafter.

Secondary switch selection within each of the grids 84 a the output side of the supergrid network is accomplished by a plurality of two-input output switch AND gating means $104_1$ through $104_4$ associated respectively with corresponding switches 84 of the grids 81. The output of each of the gating means 104 is connected via a control conductor 105 to one of the inputs of its associated bus gating means 85. The other input of each of the gating means 85 is connected to the common conducting bus of its switch 84 to which the output coordinate control conductors *n* of the switch are also connected. One of the inputs of each of the switch gating means 104 associated with a particular grid 81 is connected to each of the corresponding inputs of the other gating means 104 so associated by means of a common condutcor 106. The other input of each of the switch gating means 104 is connected to the corresponding input of the corresponding gating means 104 associated with the grids $81_1$ through $81_{16}$ and then via respective control conductors 107 to switch selector control circuitry to be described hereinafter.

Grid selection at the output side of the supergrid network of FIGS. 6 and 7 is accomplished by means of the other inputs of the switch gating means 104. The latter inputs are associated in particular groupings by means of the common conductors 106. The latter conductors are each in turn connected to respective control conductors 108 to receive control signals from the aforementioned output selector control circuitry. In the network of FIGS. 6 and 7, four level gating means 100 and their associated control conductors 103 thus control the selection of the level within a switch 84 of a grid 81, 64 gating means 104 and one set of their associated control conductors 107 connected to one of the corresponding inputs control the selection of a switch 84 within a grid 81, and the other set of 16 control conductors 108 connected to other corresponding inputs of the gating means 104 via the common conductor 106 control the selection of the grid 81 within which the selected switch and level appear.

Although any suitable gating means may be employed in the network of FIGS. 6 and 7 for the elements 83, 85, 88, 92, 100, and 104 which are well known in the art as was also the case in the network of FIG. 4, pnpn transistor triodes were also found particularly applicable for controlling the current path through the selector trees of the embodiment of FIGS. 6 and 7. The latter network proves particularly advantageous in this respect as will become clear hereinafter in that only the gating means 83, 85, 88, and 100 need be elements capable of carrying power to operate individual ferreeds since the drive current pulse from the source 90 traverses only these elements.

In order to provide effective electrical isolation for the control paths established through the network and to prevent sneak control paths, each of the *m* input control conductors of the grids 80 has a unilateral conducting element 120 connected thereto. Similarly, each of the *n* output control conductors of the grids 81 also has a unilateral conducting element 121 connected thereto. The direction of the elements 120 and 121 is from input to output of the network.

In the embodiment of FIGS. 6 and 7, six sets of control conductors 91, 95, 96, 103, 107, and 108 are selectively energized to determine a conducting path through the input and output selector trees of the supergrid network as described in the foregoing. These groups of conductors and their associated circuitry may be designated LI, SI, GI, GO, SO, and LO, respectively. External circuitry for controlling the selective enabling of the gates of the selector trees at the same time that the current pulse source 90 is energized will also be readily envisioned by one skilled in the art with respect to the network of FIGS. 6 and 7. The latter supergrid network according to this invention and its associated selector trees are thus also readily adapted for use in connection with known electronic telephone switching systems. One illustrative system substantially similar to that assumed in connection with the network of FIG. 4 is shown in FIG. 6 in simplified block symbol form only and comprises a register 110 for providing the binary signals required for enabling selected gating means of the input and output selector trees. The register 110 may be divided into sections LI, SI, GI, GO, SO, and LO, corresponding to the groups of control conductors connected to the groups of level input, switch input, grid input, grid output, switch output, and level output gating means, respectively, of the selector trees. Each section of the register 110 may conveniently comprise a plurality of well known flip-flop circuits each having a binary "1" and "0" output. Single rail logic may be achieved for the energized states of the selector conductor 91, 95, 96, 103, 107, and 108 by connecting the latter only to the binary "1" outputs of the flip-flops.

The register circuit 110 is in turn controlled by, and receives its selection instructions from, a control circuit 111 which may advantageously comprise the common control of the telephone system with which the present embodiment may be adapted for use. At the same time that control signals are selectively applied via control conductors 112 from the common control circuits 111 to the selection register 110, another control signal is also applied from the common control 111 to the pulse source 90. The latter control signal is delayed by means of a suitable delay circuit 113 to which it is conducted via a conductor 114 and is transmitted therefrom to the pulse source 90 via a conductor 115. The operation of the latter delay circuit 113 permits a stabilization of the selection register 110 to insure the proper enabling of level, switch, and grid gating means in the selector trees simultaneously with the application of a drive current pulse to the selector trees. Resetting of the selection register 110 in preparation for a subsequent network selection operation may be conveniently achieved by means of the same control signal applied to energize the pulse source 90. The latter signal may be applied, after a suitable time interval introduced by a second delay circuit 116, to the flip-flops of the register 110 in common via a reset conductor 117. Each of the delay circuits 113 and 116 comprises apparatus well known in the art and constitute only illustrative means for achieving a selection within the selector trees of the network. Accordingly, these circuits are also shown only as block symbols in the drawing.

An illustrative operation of the network of FIGS. 6 and 7 in which particular A, B, and C links are selected in the supergrid follows closely a typical operation of the network of FIG. 4. Accordingly, only so much of an illustrative operation of the network of FIGS. 6 and 7 will be described as to distinguish it from the network of FIG. 4. Although only one control path exists from any output control terminal $n$ of the primary switches of the grids 80 to any input control terminal $m$ of the secondary switches of the grids 81, any one link may be employed for a number of such control paths as will be recalled from the description of the embodiment of FIG. 4. Accordingly, although the transmission circuits associated with particular input and output control terminals of the supergrid may be idle, the transmission paths associated with a link or links interconnecting the aforementioned primary switches of the grids 80 and secondary switches of the grids 81 may not be idle. If the transmission path associated with such a link is busy and the link is then seized during a network control operation, any ferreeds having a winding connected in the coordinate control conductor of the switches to which such links may be connected will be restored to a released condition and their contacts opened. Accordingly, it will also be assumed for purposes of considering an illustrative operation of the network of FIGS. 6 and 7, that an external memory, not shown in the drawing, and not constituting a part of this invention, is provided in association with the common control circuit 111 to record the busy and idle condition of the transmission paths associated with A, B, and C links. The common control circuit 111, responsive to information received from the memory regarding the busy-idle condition of the network transmission paths, then controls the selection of the interstage links to prevent the destruction of network transmission paths established during previous operations.

An illustrative series control path through the network of FIGS. 6 and 7 is established to operate selected ferreeds within the switches of the four stages and thereby establish a transmission connection through the network. The operation of the selected ferreeds closes their respective ring and tip contacts to complete a telephone transmission path not shown in the drawing between calling and called telephone stations as is well known in the art. As was the case with respect to the network embodiment of FIG. 4, the control path through the network is selected by control signals from the common control circuits 111. These signals in turn operate to cause the register 110 to apply signals to selected ones of the control conductors sets 91, 95, 96, 103, 107, and 108 to enable selected gating means of the selector trees at both ends of the network. As will be apparent from the interconnections between levels, switches, and grids previously described, one of the gating means 88 is enabled by the selective application of an enabling signal to its control conductor 91 from the LI section of the register 110. A conducting path for a current pulse from the pulse source 90 thus is initiated via the conductor 90′ to the level input control conductor $m$ of each of the switches 82 connected to the output of the enabled gating means 88 via a multiple conductor 89 and a diode 120. The particular switch 82 through which the current pulse from the source 90 finds electrical continuity is determined by which of the bus gating means 83 is enabled. The latter determination is made by the selective enabling of a gating means 92 by the combined energization of a conductor 95 and 96. Thus the selection of a conductor 95 by the application of a signal thereto from the SI section of the register 110 partially selects the corresponding switches 82 of the grids 80 in which the selected level occurs. The energization of a conductor 96 by the application of a signal thereto from the GI section of the register 110 then finally completes the selection by determining the grid 80 in which the selected switch and level appears.

Once the selected $m$ input control conductor of the first stage of the supergrid has been determined by the selection operation generally described in the foregoing, the remaining control path segments through the supergrid network are determined by the selection of an $n$ output control conductor of the fourth stage of the supergrid. The selection operation at the output side of the supergrid shown in FIG. 7 is identical to that generally described for the input side. As will also be apparent from the interconnections between levels, switches, and grids at the output side of the supergrid, a switch 84 and the grid 81 within which the latter switch 84 appears are selected by the combined enabling signals applied to selected ones of the conductor sets 107 and 108 from the SO and GO sections of the register 110 and hence to selected ones of the gating means 104. From the inter connections previously described, it will be apparent that only one of the gating means 84 of the sixty-four such means connected to the switches 84 will have an enabling signal applied to both of its inputs. The bus gating means 85 of a selected switch 84 in a selected one of the grids 81 will thus be selected. The final selection to be made is the level within the latter selected switch 84 on which the output side control conductor $n$ falls and which control conductor $n$ is to be connected to ground or other potential through a diode 121. This selection is made by applying an enabling signal to a selected control conductor 103 from the LO section of the register 110 and thereby to one of the inputs of a gating means 100. Since each of the gating means 100 is connected by one of its inputs to each corresponding level of each of the switches 84 and grids 81, it is clear that a current path will be available when a gating means 100 is enabled no matter in which grid the selected level appears. Obviously, each of the selection operations thus generally reviewed occurs simultaneously and the gates in both the input and output selector trees of the supergrid network are enabled for a sufficient time interval to permit the application of a pulse from the source 90.

In FIGS. 8 and 9 is shown another illustrative switching network according to the principles of this invention also having three stages of selection at each end. Between the output side of its first stage and the input side of its fourth stage, the network of FIGS. 8 and 9 is identical in every respect to the corresponding portions of the two networks previously described in connection with FIGS. 4, 6, and 7. The interstage A, B, and C links interconnecting the switches and grids of the four stages are thus made in a manner also identical to that described in connection with the corresponding links of the network of FIGS. 6 and 7, for example. Like the network of FIG. 4, the switches employed in each of the grids of the four stages of the supergrid are identical to those already described and depicted in FIG. 1, that is, the common conducting bus connecting each of the coordinate control conductors of a switch is unbroken and provides a continuous ungated series control path between any *m* coordinate control conductor and any *n* coordinate control conductor connected thereto. As previously described, transmission conductors (not shown) may parallel the coordinate control conductors *m* and *n* of the respective switches and the links interconnecting the coordinate control conductors *m* and *n* of the various network stages.

In the network presently being considered, however, the switches of the first and four stages of the supergrid are employed in an advantageous manner in accordance with another aspect of this invention so that the common conducting bus provides a means for simultaneously applying energizing current pulses to the two sets of coordinate control conductors and also provides a means for simultaneously transmitting current pulses applied to the two sets of coordinate control conductors to other sections of the network. In order to accomplish this modified operation of the common conducting bus, a shunt connection is made at the bus at a point between the connections of the two groups of *m* and *n* coordinate control conductors. This bus connection will become clear from a consideration of a more detailed description of the network of FIGS. 8 and 9.

The first stage of the supergrid network of FIGS. 8 and 9 comprises a plurality of switches 130$_1$ through 130$_{16}$ each having a continuous common conducting bus connecting the two sets of *m* and *n* coordinate control conductors such as is depicted in FIG. 1. For purposes of description, however, the common conducting bus of each switch 130 of the first stage has the two portions thereof to which the coordinate control conductors *m* and *n* are connected, designated *d* and *e*, respectively. In order to differentiate between the connections made to the common conducting busses of the switches of the first and second stages of the supergrid, the busses of the switches of the first stage are symbolized by a double line in the block symbols representing the switches. As in the previous networks described, the switches 130 of the supergrid are grouped by grids 131$_1$ through 131$_{16}$ on the input side and the switches of the output side are grouped by grids 132$_1$ through 132$_{16}$. The grids 132 of the output side have in the fourth stage a plurality of switches 133$_1$ through 133$_{16}$, the latter switches also having shunt connections made to the common conducting busses between the portions *d* and *e* thereof as was the case in the switches 130. The common conducting busses of the switches 133 are also symbolized by double lines in the block symbols. Since the supergrid network of FIGS. 8 and 9 is identical in capacity and interstage connections to the networks previously described, the switches and grids of the present network need not be more specifically described in order to obtain an understanding of its organization and operation.

In the present supergrid network, the selection or marking, of a control conductor terminal at the input side of the network and the selection of a control conductor terminal at the output side of the network determines a unique, continuous series control path through the network. However, in the present network organization three selection stages at each side of the network are effective to accomplish two distinct selection operations at each side of the network. On the input side of the network a particular switch 130 of the sixteen grids 131 is selected to have an energizing current pulse applied to its common conducting bus at its shunt connection. This current pulse divides between the two portions *d* and *e* of the bus, one part of the current being applied to the *n* output control conductors of the selected switch and thence via the interstage links to the output side of the supergrid. The other part of the divided current pulse is applied to the *m* control conductors of the selected switch, one of which *m* control conductors is selected on a level selection basis to provide a path to ground for the latter part of the current pulse applied at the input side of the network.

On the output side of the supergrid the three stage selector tree is also effective to accomplish two distinct selection operations. One of the switches 133 of the sixteen grids 132 is selected to provide, through its common conducting bus, and more particularly to the portion *d* thereof to which its *m* control conductors are connected, a path to ground for the part of the energizing current pulse applied to the input side of the supergrid network and which was carried through the network via the interstage links. The level selection on the output side of the supergrid network is made by selecting a particular *n* control conductor of the selected switch 133 and applying another current pulse thereto simultaneously with the application of the current pulse to the common conducting bus of the selected switch 130 at the input side of the network. The current pulse applied to the selected *n* control conductor at the output side of the network is conducted to ground via the same common conducting bus carrying to ground the part of the current pulse applied at the input side of the network.

The operation of the shunted common conducting bus of a switch 130 and 133 will be better understood from a consideration of the simplified connections shown in FIG. 10. In the latter figure are shown the control connections of a first stage switch 130 and a fourth stage switch 133 having the *n* and *m* coordinate control conductors connected via interstage links not specifically shown. The *m* coordinate control conductors of the switches 130 and 133 are each connected to the *d* portion of the common conducting bus and the *n* coordinate control conductors are each connected to the *e* portion of the same conducting bus. In accordance with the foregoing general description, a current pulse 134, which may for purposes of description assume to be positive, is applied to the input control terminal 135 and thereby via a conductor 135' to the common conducting bus of the switch 130 at a point between the *d* and *e* portions. At this point the current pulse 134 divides, one part being conducted along the *e* portion of the bus to an *n* coordinate control conductor and thence via unique interstage links to an *m* coordinate control conductor of the switch 133. The divided part of the current pulse 134 then is conducted via the portion *d* of the common conducting bus of the switch 133 via another conductor to ground. The other divided part of the current pulse 134 is conducted via a selected level *m* coordinate control conductor and a diode to ground at the input side of the simplified connections shown in FIG. 10. At the output side, simultaneously with the application of the current pulse 134, another current pulse 136 is applied to a terminal 137 and a conductor 137' and thereby via a diode to a selected *n* coordinate control conductor of the switch 133. The current pulse 136 is then conducted via the portion *e* of the common conducting bus of the switch 133 to ground. The current pulse 136 may also be assumed for purposes of description to be positive and both the pulses 134 and 136 are adjusted in magnitude sufficient to operate the ferreeds at the crosspoints of the coordinate control conductors. It will be appreciated that the current pulse 134 will be twice the magnitude of the current pulse 136 since the former divides at the parallel paths presented by the coordinate control conductors of the switch 130. As a result, each of the divided parts of the pulse 134 must be sufficient to energize the respective control winding sets of the selected crosspoint ferreed of the switch 130 to which it is directed. The detailed manner in which the simplified switch connections shown in FIG. 10 are adapted to achieve an advantageous switching network will become clear from the development of the description of the illustrative network of FIGS. 8 and 9, which description may now be continued.

Selection at each end of the supergrid network of FIGS. 8 and 9 is made by selecting the level within each of the switches 130 of the grids 131 and the switches 133 of the grids 132 on which the selected *m* and *n* control conductor terminals fall, the particular switch 130 and 133 within each of the grids within which the selected *m* and *n* control conductor terminals occur, and finally the particular grids 131 and 132 in which the selected switches occur. Level selection at the input side of the supergrid network is accomplished by a plurality of two-input level AND gating means $140_1$ and $140_4$ corresponding respectively to the four levels of each of the switches 130 of the A link grids 131. The output ends of the gating means 140 are connected together by means of a conductor 141 and thereby to ground through a resistance element 141'. One corresponding input of each of the gating means 140 is connected via conductors $142_1$ through $142_4$ and then via multiple conductors 143 to respective control conductor terminals $m_1$ through $m_4$ of each of the switches 130 of the grids 131. A control input of each of the gating means 140 is connected via a control conductor 144 to level selector control circuitry.

Switch selection within each of the grids 131 at the input side of the supergrid network of FIGS. 8 and 9 is accomplished by means of a plurality of two-input switch AND gating means $145_1$ through $145_4$ associated respectively with the individual switches 130 of the grids 131. The output ends of the gating means $145_1$ through $145_4$ specifically are multiplied respectively to inputs of grid AND gating means to be considered hereinafter, outputs of the latter gating means then completing the connection to the common conducting busses of the switches 130. One input of each of the gating means 145 is connected via a control conductor 146 to switch selector control circuitry. The other inputs of each of the gating means 145 are connected together by means of a common conductor 147 and thence via a conductor 148' to a source of current pulses 148.

Grid selection at the input side of the present supergrid network is accomplished by a plurality of two-input grid AND gating means $150_1$ through $150_4$ in four groups associated respectively with corresponding switches 130 of the grids 131. The output of each of the gating means 150 is connected via a conductor 151 to the common conducting bus of its associated corresponding switch 130. The connection of a conductor 151 is made at a point on the conducting bus of a switch 130 as illustrated in FIG. 10 for the connection of the conductor 135'. One of the inputs of each of the switch gating means 150 associated with a particular grid 131 is connected to each of the corresponding inputs of the other gating means 150 so associated by means of a common conductor 152. The other inputs of each of the switch gating means 150 are grouped by corresponding switches 130 of the grids 131 and are so connected together by means of multiple conductors 153. The latter conductors 153 are then connected to the respective outputs of the switch AND gating means $145_1$ through $145_4$. The inputs of the gating means 150 connected together by grids by means of the conductors 152 are connected to grid selector control circuitry by means of control conductors 154. It is thus apparent that four control conductors 144 provide the means for enabling the gating means 140 for selecting one of the four levels of the switches 130, four control conductors 146 provide the means for enabling the gating means 145 for selecting one of the four switches 130 of the grids 131, and sixteen control conductors 154 provide the means for enabling the gating means 150 for selecting one of the sixteen grids 131. A current path at the input side of the supergrid may thus be traced from the pulse source 148 via the conductor 148', an input of one of the switch gating means 145, any one of the grid gating means 150 via a conductor 153, the output of a gating means 150 and the conductor 151, to its associated switch 130 common conducting bus. At this point the current path divides to form two parallel branch paths: one traced along the portion *e* of the common conducting bus, a selected *n* output coordinate control conductor, and then via the interstage A, B, and C links to the other side of the supergrid, the other path traced along the portion *d* of the common conducting bus, a selected *m* coordinate control conductor, a multiple conductor 143, an input conductor 142 of a selected level gating means 140, common conductor 141, resistance element 141'; and ground. A unilateral conducting element 155 is inserted in each of the *m* coordinate control conductors at the input side of the supergrid in a direction to permit the conduction of current therethrough to ground at the conductor 141. The elements 155 serve the function of isolating the selected control paths selected in the network and thus prevent the occurence of sneak control paths.

The selector access circuitry as well as the internal organization of the supergrid network of FIGS. 8 and 9 is symmetrical. The A link grids 131 shown in FIG. 8 being interconnected with the C link grids 132 shown in FIG. 9 by means of the B links and intermediate switches, only representative B links, 156 through 159, being shown in the drawing. The latter representative links each also has a unilateral conducting element therein to represent the fact that each of the B links includes such an element. The output selector tree arrangement of gating means is identical to that described in connection with the input selector tree in the foregoing. The selection at the output side of the network also performs two distinct operations. In one of the operations a path to ground is selectively provided for the divided part of the current pulse applied to the input side of the network. In the other operation a current pulse is applied to a selected level *n* coordinate control conductor. The latter current pulse may advantageously be supplied by the pulse source 148 and is conducted from the output of the latter source 148 to the output side of the supergrid network by means of a conductor 160. Level selection at the output side of the network is accomplished by a plurality of two-input level AND gating means $161_1$ through $161_4$ corresponding respectively to the four levels of each of the switches 133 of the C link grids 132. Corresponding ones of the inputs of the gating means 161 are connected together by means of a common conductor 162 and thereby to the conductor 160 connected to the output of the pulse source 148. The other corresponding inputs of the gating means 161 are each connected by means of a control conductor 163 to level selector control circuitry. The outputs of the gating means 161 are connected to respective control conductor terminals $n_1$ through $n_4$ of each of the switches 133 of the grids 132 via multiple conductors 164. A resistance element 165 is inserted in the outputs of the gating means 161 to adjust the amplitude of the current pulse received from the input side of the supergrid network for reasons which will become apparent hereinafter.

Switch selection within each of the grids 132 at the output side of the network is accomplished by means of a plurality of two-input switch AND gating means $167_1$ through $167_4$ associated respectively with the individual switches 133 of the grids 132. The output ends of the gating means 167 are connected together by means of a conductor 168 and thereby to ground. One corresponding input of each of the gating means 167 is multipled by means of a multiple conductor 169 to corresponding outputs of grid AND gating means to be described hereinafter. The other corresponding inputs of each of the gating means 167 is connected by means of a control conductor 170 to switch selector control circuitry.

Grid selection at the output side of the supergrid network of FIGS. 8 and 9 is accomplished by a plurality of two-input grid AND gating means $171_1$ through $171_4$ in four groups associated respectively with corresponding switches 133 of the grids 132. The output of each of the gating means 171 are connected via the multiple conductors 169 to the inputs of the corresponding switch gating means 167 as previously mentioned. One of the corresponding inputs of each of the gating means 171 of each of the four groups is connected to each of the other corresponding inputs of the gating means 171 of the same group by means of a common conductor 172. The other corresponding inputs of the gating means 171 of each of the four groups are connected respectively via conductors 173 to the common conducting busses of the associated switches 133 between the portions *d* and *e* thereof as illustrated in FIG. 10. The common conductors 172 are respectively connected to control conductors 174 which are in turn connected to grid selector control circuitry.

It is thus apparent that four control conductors 163 provide the means for enabling the gating means 161 for selecting one of the four levels of the switches 133, four control conductors 170 provide the means for enabling the gating means 167 for selecting one of the four switches 133 of the grids 132, and sixteen control conductors 174 provide the means for enabling the gating means 171 for selecting one of the sixteen grids 132.

During a network selection operation, two primary control circuit paths may be traced from the output of the pulse source 148 of FIG. 8. At the conductor 148' one of the primary circuit branches may be traced to the input side of the network through an input of a switch gating means 145, a multiple conductor 153 to an input of a grid gating means 150, and an output conductor 151 of the latter gating means 150 to a common conducting bus of a selected switch 130. At this point two further secondary branches are formed: one being traceable through the portion *d* of the conducting bus, an *m* control conductor and its included unilateral conducting element 155, a multiple conductor 143, an input conductor 142 of a level gating means 140, one of the gating means 140, and thence via the common conductor 141 and resistance element 141' to ground; the other of the secondary branch paths is traceable through the *e* portion of the conducting bus and then through the network itself via the A, B, and C links. At the C link grids the latter secondary branch path terminates in the *d* portion of the conducting bus of a selected switch 133. The other primary circuit path traceable directly from the output of the pulse source 148 mentioned in the foregoing may be traced along the conductor 160, an input of a level gating means 161 via the common conductor 162, resistance element 165, multiple conductor 164, a selected *n* coordinate control conductor of the selected switch 133, to the *e* portion of the common conducting bus at which point the abovementioned secondary branch path was also terminated. The two branch control paths just described then are traceable to ground via a conductor 173 connected to a input of a grid gating means 171, a grid gating means 171 and its output connected to a multiple conductor 169, an input of a switch gating means 167, and the multiple conductor 168. Unilateral conducting elements 175 are also included in the *n* coordinate control conductors at the output side of the supergrid network to prevent sneak conducting paths and thereby to isolate the individual control paths through the network.

In the embodiment of FIGS. 8 and 9, six sets of control conductors 144, 146, 154, 163, 170, and 174 are selectively energized to determine a control path through the network and also to determine the *m* and *n* control conductors at the opposite sides of the network to which a current pulse is conducted to ground and to which it is applied, respectively. As in the network embodiment of FIGS. 6 and 7, these groups of conductors and their associated circuitry may be designated LI, SI, GI, GO, SO, and LO, respectively. The external circuitry for controlling the selective enabling of the gates of the selector trees at the same time that the current pulse source 148 is energized may be substantially identical to that shown in FIGS. 6 and 7 and generally described in connection with these figures with one exception. The pulse source 148, although controlled in a manner previousy described, is of a character to supply a pulse of magnitued sufficient to operate the ferreeds at the selected crosspoints after its division among the branch control paths traced herebefore. Since the control circuitry is identical to that described in connection with the network of FIGS. 6 and 7, the present control circuitry depicted in FIG. 8 may be understood by reference to the latter network.

It will be appreciated that the same requirements of coincidence of amplitude and time that apply to the networks of FIGS. 4, 6, and 7, in view of the ferreed crosspoints employed, apply with equal force to the network embodiment of FIGS. 8 and 9. These requirements are amply satisfied in the latter network as is apparent from the manner in which the energizing current pulses are applied. Thus the control of the pulse source 148 effectively controls the timing of the pulses applied to each side of the network and in each control path branch presented thereto. To insure that the amplitude of the current pulses applied to the ferreed crosspoints in the switches 130 and 133 where the control winding sets appear in different branches of the network, a resistance element 141' and a resistance element 165 in the input and output side branches are provided. The value of the resistance element 141' is adjusted so that the magnitude of the current in the A, B, and C links branch substantially equals the current magnitude in the branch including a selected *m* coordinate control conductor of a switch 130. Similarly, the value of the resistance element 165 is adjusted so that the magnitude of the current in the branch including an *n* coordinate control conductor of a switch 133 substantially equals the current in the A, B, and C links branch. The total current magnitude of a pulse supplied by the pulse source 148 is thus determined as being three times that appearing in the branches including a control winding set of a crosspoint ferreed. The magnitude of the current applied to any one of the gates 145 and 150 and thereby to a common conducting bus of a switch 130 is thus two-thirds that of the total current supplied by the pulse source 148.

The gating means employed in the network of FIGS. 8 and 9 may also comprise pnpn transistor triodes of the character also suitable for use in the networks of FIGS. 4, 6, and 7. It will also be appreciated by those skilled in the art that, instead of employing the same pulse source 148 to supply the pulses to both sides of the network simultaneously, separate pulse sources could be used at each side. In such an alternative arrangement coincidence of current pulses is readily insured by the common control of both pulse sources from the common control circuitry of the telephone system with which the network may be adapted for use. Either of the network embodiments of FIGS. 6–7 and 8–9 may also advantageously be expanded to add another supergrid unit in the manner described in connection with the embodiment of FIG. 4. Junctor connections in such a case would again be made following the last stage of the first supergrid with the junctors themselves being selected by means of relay contacts or other means known in the art to add to the flexibility of the network.

What have been described are considered to be only illustrative network embodiments of this invention, and it is to be understood that various and numerous other arrangements and modifications incorporating therein various combinations of the alternate forms of the ferreed switch common conducting bus may be devised by one skilled in the art without departing from the spirit and scope of this invention.

What is claimed is:

1. A multistage telephone switching network having in each of its stages a plurality of arrays of crosspoint devices; each of said arrays having first and second coordinate control conductors, each said crosspoint device of an array including contact means responsive to coincident energization of a first and second coordinate control conductor to establish a unique transmission path through said array; and compising a conducting means for each of said arrays for connecting each of said first coordinate control conductors of an array with each of said second coordinate control conductors of the same array; a pluality of interstage control links each having a unilateral conducting element therein for connecting a second coordinate control conductor of each of said arrays of one stage to a first coordinate control conductor of each, array of the succeeding stage; and marking means for simultaneously applying different potentials to selected first and second coordinate control conductors of the arrays of only the fist and last stages of said network, respectively.

2. A multistage telephone switching network as claimed in claim 1 in which said marking means comprises a first and a second multistage selector tree arrangement of gating means at the input and output side of only said first and last stages of said network, respectively, and means for selectively enabling one gating means in each stage of said tree arrangement at each side of said network.

3. A multistage telephone switching network as claimed in claim 2 in which each of the gating means of one of the stages of said first selector tree arrangement is connected in said conducting means of an array of the first stage of said plurality of arrays between the connections of said first and second coordinate control conductors.

4. A multistage telephone switching network as claimed in claim 3 in which each of the gating means of one of the stages of said second selector tree arrangement is connected in said conducting means of an array of the last stage of said plurality of arrays between the connections of said first and second coordinate control conductors.

5. A coordinate array switch comprising a plurality of relay means arranged at the cosspoints of said array, a plurality of energizing conductors arranged in first and second coordinates of said array for operating said relay means, first conducting means for directly interconnecting one end of each of the energizing conductors in said first coordinate, second conducting means for directly interconnecting one end of each of the energizing conductors in said second coordinate, and gating means for connecting said first conducting means directly to said second conducting means electrically to connect all said one ends together.

6. A coordinate array switch as claimed in claim 5 in which each of said relay means comprises a ferreed device operable responsive to the coincident energization of the energizing conductors of a first and second coordinate defining a crosspoint.

7. A coordinate array switch as claimed in claim 6 also compising means for applying an energizing current pulse to the other end of a selected energizing conductor in a first coordinate and means for enabling said gating means simultaneously with said application of said current pulse to complete a current path between said first conducting means and said second conducting means.

8. An electrical switching network comprising a plurality of stages each comprising a plurality of switches; each of said switches comprising a coordinate array of ferreed devices energizable by the coincident energization of first and second coordinate control conductors for establishing unique transmission paths through said switch, and means for connecting each of said first coordinate control conductors with each of said second coordinate control conductors; said switches being grouped in symmetrical two-stage grids; a plurality of interswitch control links each including a unilateral conducting element for interconnecting a second coordinate control conductor of each switch of each of the first stages of said grids with a coordiate control conductor of each of the switches of the second stage of the same grid; a plurality of intergrid control links each including a unilateral conducting element for interconnecting each second stage switch of each two-stage grid with each first stage switch of each succeeding two-stage grid; first marking means for applying an energizing current pulse to only a selected first coordinate control conductor of a selected first stage switch within a selected first two-stage grid; and second marking means for applying a ground potential to only a selected second coordinate control conductor of a selected second stage switch within a selected succeeding two stage grid.

9. A telephone switching network comprising a plurality of stages of switch arrays; each array comprising a plurality of electromagnetically controlled relay means operated responsive to the coincident energization of a first and a second winding means associated therewith, first and second coordinate control conductors including respectively said first and second winding means, each said relay means including contacts for completing a unique transmission path through said array when said relay means is operated, and common conducting means for connecting together one end of each of said first and second coordinate control conductors, said conducting means having a terminal thereon; a plurality of control links for interconnecting the other end of a second coordinate control conductor of each switch array of each of said stages with the other end of a first coordinate control conductor of each of the switch arrays of the succeeding stage each of said control links including a unilateral conducting element; means for simultaneously applying a drive current pulse to the terminal of a common conducting means of a selected switch array of the first stage of said plurality of stages and to the other end of a selected second coordinate control conductor of a selected switch array of the last stage of said plurality of stages; and means for applying a ground potential to a selected first coordinate control conductor of said selected switch array of said first stage and to the terminal of the common conducting means of said selected switch of said last stage simultaneously with said drive current pulse.

10. A multistage telephone switching network having in each of its stages a plurality of arrays of crosspoint devices; each of said arrays having first and second coordinate control conductors and a conducting means having a terminal thereon and having connected thereto one end of each of said first coordinate control conductors of said array and one end of each of said second coordinate control conductors of said array; a plurality of interstage control links each having a unilateral conducting element therein for connecting each of said arrays of one stage to each array of the succeeding stage; first marking means for simultaneously applying operating potentials to the terminal of the conducting means of a selected array of the first stage of said network and to the other end of a selected second coordinate control conductor of a selected array of the last stage of said network; and second marking means operative simultaneously with said first marking means for simultaneously applying ground potentials to the other end of a selected second coordinate control conductor of said selected array of said first stage and to the terminal of the conducting means of said selected array of said last stage.

11. An electrical switching network comprising a plurality of stages each comprising a plurality of arrays of electrical contacting means arranged in rows and columns; each of said contacting means having a first and second winding means associated therewith; each of said arrays comprising a plurality of row circuit means for connecting the first winding means of the contacting means of each of said rows of said arrays in series, a plurality of column circuit means for connecting the second winding means of the contacting means of each of said columns of said array in series, each said contacting means of said array responsive to coincident energization of said associated first and second winding means for completing a unique transmission path through said array, and a common conducting bus connecting one end of all of said plurality of row circuit means to one end of all of said plurality of column circuit means; a plurality of control paths for selectively controlling said contacting means each including a row and column circuit means of an array of each of said stages and further including one of a plurality of interstage control links each having a unilateral conducting element therein for connecting a particular row circuit means of the arrays of each of said stages to a particular column circuit means of the arrays of the next succeeding stage; first marking means comprising a first multistage selector tree arrangement of gating means for selectively applying first potentials to the column circuit means of the arrays of only the first stage of said plurality of stages and having in one of its stages a plurality of said gating means connected respectively in the common conducting busses of the arrays of contacting means of the first stage of said network between said row and column circuit means; and second marking means comprising a second multistage selector tree arrangement of gating means for selectively applying second potentials to the row circuit means of the arrays of only the last stage of said plurality of stages simultaneously with said first potentials.

12. An electrical switching network as claimed in claim 11 wherein said second marking means includes in one of its stages a plurality of said gating means connected respectively in the common conducting busses of the arrays of contacting means of the last stage of said network between said row and column circuit means.

13. In an electrical switching network, a plurality of coordinate arrays of ferreeds, each of said ferreeds including a first and a second winding and each of said coordinate arrays including a plurality of first coordinate control conductors including first windings of said ferreeds, a plurality of second coordinate control conductors including second windings of said ferreeds, and a common conducting bus connecting one end of all said first and second coordinate control conductors together; and selection means for selecting a particular ferreed in a particular array comprising gating means interposed in said common conducting busses, means for applying control signals to the other ends of said first and said second coordinate control conductors, and means for applying enabling signals to one of said gating means.

References Cited by the Examiner

UNITED STATES PATENTS

| | | | |
|---|---|---|---|
| 2,844,811 | 7/1958 | Burkhart | 340—166 |
| 3,005,072 | 10/1961 | Brown | 179—27.54 |
| 3,037,085 | 5/1962 | Lowry | 179—27.54 |
| 3,053,936 | 9/1962 | Steinbuch et al. | 340—166 |
| 3,055,982 | 9/1962 | Kowalik | 179—18 |

ROBERT H. ROSE, *Primary Examiner.*

WALTER L. LYNDE, *Examiner.*